(12) United States Patent
Gauthier et al.

(10) Patent No.: US 7,516,622 B2
(45) Date of Patent: Apr. 14, 2009

(54) METHOD AND APPARATUS FOR ENERGY RECOVERY IN AN ENVIRONMENTAL CONTROL SYSTEM

(75) Inventors: Dale A. Gauthier, San Diego, CA (US); Guy D. Covert, Rancho Santa Fe, CA (US)

(73) Assignee: Lime Energy Co., Elk Grove Village, IL (US)

( * ) Notice: Subject to any disclaimer, the term of this patent is extended or adjusted under 35 U.S.C. 154(b) by 363 days.

(21) Appl. No.: 11/280,804

(22) Filed: Nov. 15, 2005

(65) Prior Publication Data

US 2006/0130500 A1    Jun. 22, 2006

Related U.S. Application Data

(60) Continuation of application No. 10/688,106, filed on Oct. 17, 2003, now Pat. No. 6,986,469, which is a continuation of application No. 10/268,070, filed on Oct. 7, 2002, now Pat. No. 6,637,667, which is a division of application No. 09/746,213, filed on Dec. 22, 2000, now Pat. No. 6,474,084, which is a continuation of application No. 09/351,974, filed on Jul. 12, 1999, now Pat. No. 6,176,436, which is a continuation of application No. 08/933,871, filed on Sep. 19, 1997, now Pat. No. 6,062,482.

(51) Int. Cl.
*F25B 49/00* (2006.01)
*G05D 23/32* (2006.01)

(52) U.S. Cl. .................. 62/157; 62/176.6; 236/44 C

(58) Field of Classification Search ............... 62/176.6, 62/157, 231; 236/44 C
See application file for complete search history.

(56) References Cited

U.S. PATENT DOCUMENTS

| | | | |
|---|---|---|---|
| 3,024,007 A | 3/1962 | Gordon | |
| 3,265,301 A | 8/1966 | Amdur et al. | |
| 3,346,040 A | 10/1967 | Cohen | |
| 3,605,875 A | 9/1971 | McBride, Jr. | |
| 3,627,030 A | 12/1971 | Lorenz | |
| 3,636,369 A | 1/1972 | Harter | |
| 3,706,914 A | 12/1972 | Van Buren | |
| 3,913,344 A | 10/1975 | Holloway et al. | |
| 3,915,376 A | 10/1975 | Attridge, Jr. | |

(Continued)

FOREIGN PATENT DOCUMENTS

EP    0 238 979 A2    3/1987

(Continued)

OTHER PUBLICATIONS

Condyne Technology Inc., "product information, 1996, 11 pages".

(Continued)

*Primary Examiner*—Marc E Norman
(74) *Attorney, Agent, or Firm*—Ungaretti & Harris LLP

(57) ABSTRACT

Control apparatus for an environmental control system comprises input circuitry receiving environmental information and output circuitry for controlling an HVAC system. Processing circuitry in the controller configures the output circuitry based at least in part on the signals received on the input circuitry. Information about the status of the HVAC system may be transferred to system administrators using a wireless link.

4 Claims, 22 Drawing Sheets

U.S. PATENT DOCUMENTS

| | | | |
|---|---|---|---|
| 4,082,981 A | 4/1978 | Morton et al. | |
| 4,132,355 A | 1/1979 | Cleary et al. | |
| 4,136,730 A | 1/1979 | Kinsey | |
| 4,215,408 A | 7/1980 | Games et al. | |
| 4,261,037 A | 4/1981 | Hicks | |
| 4,283,007 A | 8/1981 | Bramow et al. | |
| 4,298,946 A | 11/1981 | Hartsell et al. | |
| 4,323,191 A | 4/1982 | Chiyoda et al. | |
| 4,333,519 A | 6/1982 | Shafrir et al. | |
| 4,350,023 A * | 9/1982 | Kuwabara et al. | 62/176.6 |
| 4,361,273 A | 11/1982 | Levine et al. | |
| 4,399,864 A | 8/1983 | Lamar | |
| 4,419,665 A | 12/1983 | Gurr et al. | |
| 4,478,048 A | 10/1984 | Dills | |
| 4,494,010 A | 1/1985 | Donnelly | |
| 4,506,514 A | 3/1985 | Lamar et al. | |
| 4,557,317 A | 12/1985 | Harmon, Jr. | |
| 4,558,595 A | 12/1985 | Kompelien | |
| 4,616,325 A | 10/1986 | Heckenbach et al. | |
| 4,659,009 A | 4/1987 | Newell, III | |
| 4,667,874 A | 5/1987 | Johnson et al. | |
| 4,725,001 A | 2/1988 | Carney et al. | |
| 4,734,871 A | 3/1988 | Tsunoda et al. | |
| 4,744,223 A | 5/1988 | Umezu | |
| 4,750,672 A | 6/1988 | Beckey et al. | |
| 4,852,363 A | 8/1989 | Kampf et al. | |
| 4,860,552 A | 8/1989 | Beckey | |
| 4,869,073 A * | 9/1989 | Kawai et al. | 62/160 |
| 4,964,058 A | 10/1990 | Brown, Jr. | |
| 5,097,671 A | 3/1992 | Jeong-Hun | |
| 5,129,234 A | 7/1992 | Alford | |
| 5,224,648 A | 7/1993 | Simon et al. | |
| 5,244,146 A | 9/1993 | Jefferson et al. | |
| 5,279,458 A | 1/1994 | DeWolf et al. | |
| 5,289,362 A | 2/1994 | Liebl et al. | |
| 5,321,229 A | 6/1994 | Holling et al. | |
| 5,326,026 A | 7/1994 | Jefferson et al. | |
| 5,340,028 A | 8/1994 | Thompson | |
| 5,346,129 A | 9/1994 | Shah et al. | |
| 5,348,078 A | 9/1994 | Dushane et al. | |
| 5,390,206 A | 2/1995 | Rein et al. | |
| 5,394,064 A | 2/1995 | Ranganath et al. | |
| 5,395,042 A | 3/1995 | Riley et al. | |
| 5,407,129 A | 4/1995 | Carey et al. | |
| 5,449,112 A | 9/1995 | Heitman et al. | |
| 5,460,006 A | 10/1995 | Torimitsu | |
| 5,475,986 A | 12/1995 | Bahel et al. | |
| 5,481,481 A | 1/1996 | Frey et al. | |
| 5,495,722 A | 3/1996 | Manson et al. | |
| 5,499,512 A | 3/1996 | Jurewicz et al. | |
| 5,564,625 A | 10/1996 | Straub | |
| 5,579,994 A | 12/1996 | Davis, Jr. et al. | |
| 5,597,354 A | 1/1997 | Janu et al. | |
| 5,598,349 A | 1/1997 | Elliason et al. | |
| 5,605,280 A | 2/1997 | Hartman | |
| 5,631,843 A | 5/1997 | Munday et al. | |
| 5,640,153 A | 6/1997 | Hildebrand et al. | |
| 5,678,758 A | 10/1997 | Takegawa et al. | |
| 5,682,949 A | 11/1997 | Ratcliffe et al. | |
| 5,696,695 A | 12/1997 | Ehlers et al. | |
| 5,706,214 A | 1/1998 | Putt et al. | |
| 5,711,480 A | 1/1998 | Zepke et al. | |
| 5,734,230 A | 3/1998 | Edwards et al. | |
| 5,911,747 A | 6/1999 | Gauthier | |
| 5,930,773 A | 7/1999 | Crooks et al. | |
| 5,953,237 A | 9/1999 | Indermaur et al. | |
| 5,971,284 A | 10/1999 | Hammer | |
| 6,046,549 A | 4/2000 | James | |
| 6,061,609 A | 5/2000 | Kanoi et al. | |
| 6,062,482 A | 5/2000 | Gauthier et al. | |
| 6,078,146 A | 6/2000 | Reverberi | |
| 6,157,175 A | 12/2000 | Morinigo et al. | |
| 6,157,874 A | 12/2000 | Cooley et al. | |
| 6,176,436 B1 | 1/2001 | Gauthier et al. | |
| 6,185,483 B1 | 2/2001 | Drees | |
| 6,278,909 B1 | 8/2001 | Thibeault et al. | |
| 6,459,606 B1 | 10/2002 | Jadric | |
| 6,474,084 B2 | 11/2002 | Gauthier et al. | |
| 6,553,418 B1 | 4/2003 | Collins et al. | |
| 6,637,667 B2 | 10/2003 | Gauthier et al. | |
| 6,664,771 B2 | 12/2003 | Scoggins et al. | |
| 6,718,213 B1 | 4/2004 | Enberg | |
| 6,986,469 B2 | 1/2006 | Gauthier et al. | |
| 2002/0034086 A1 | 3/2002 | Scoggins et al. | |

FOREIGN PATENT DOCUMENTS

| | | |
|---|---|---|
| GB | 2 308 697 A | 7/1997 |
| JP | 09068338 | 11/1997 |
| WO | WO-98/53648 | 11/1998 |

OTHER PUBLICATIONS

Larson, et al., "Static Electronic Tap-Changer for fast phase voltage control", *IEEE*, 1997, pp. TC3-4.1 - TC3-4.3.

* cited by examiner

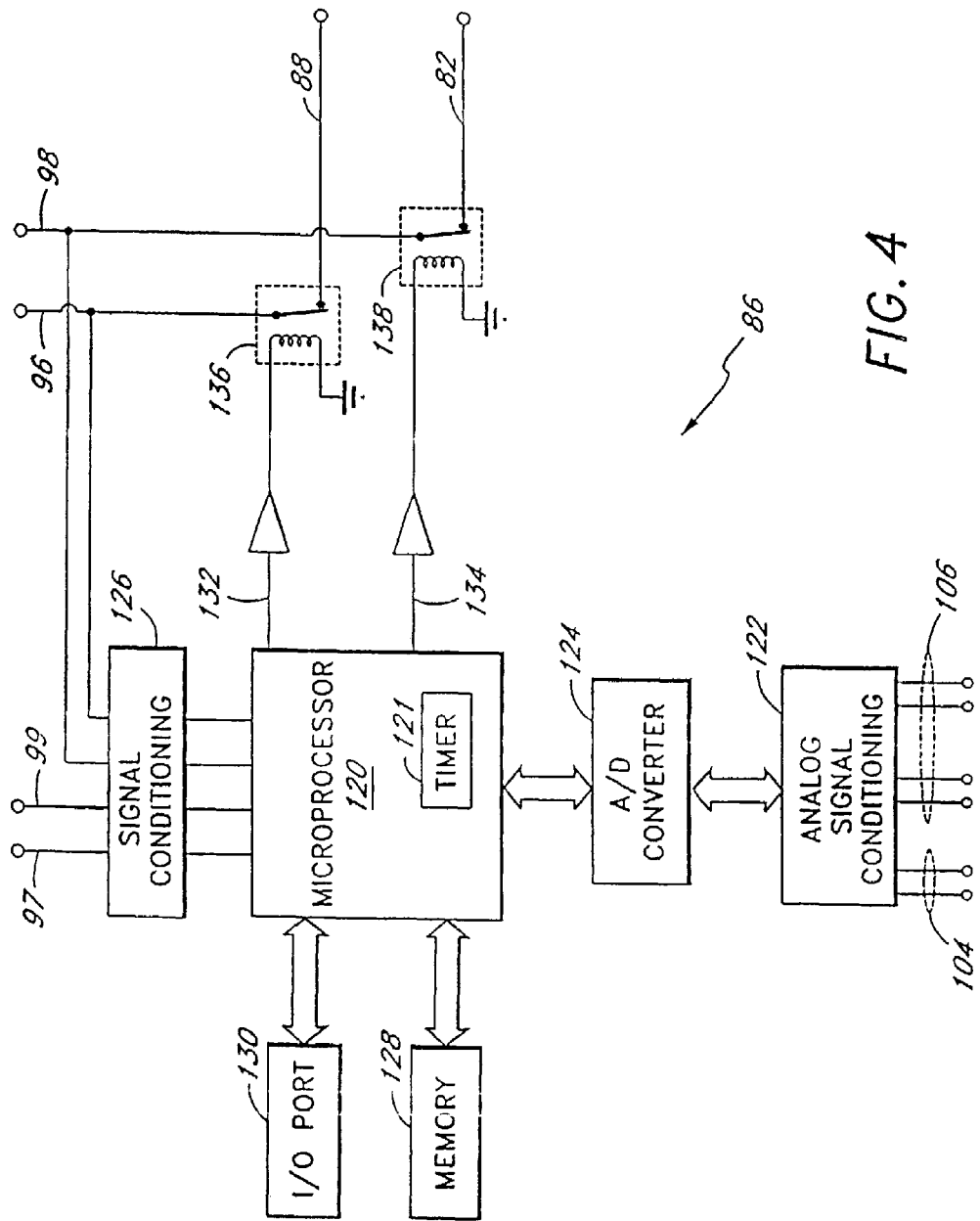

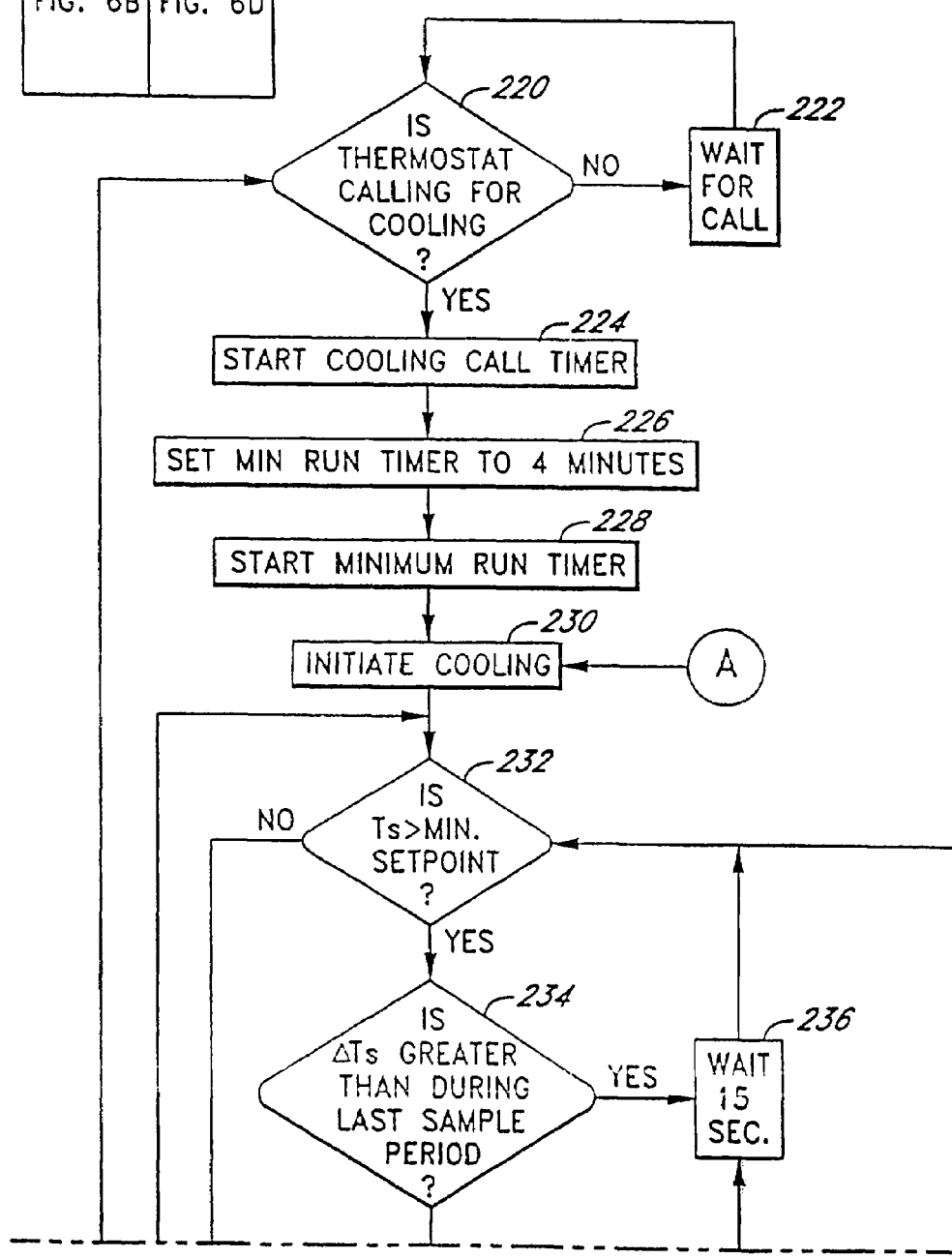

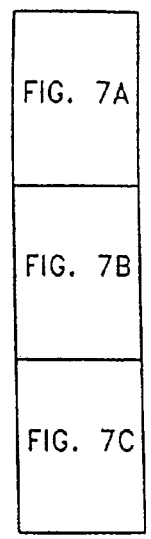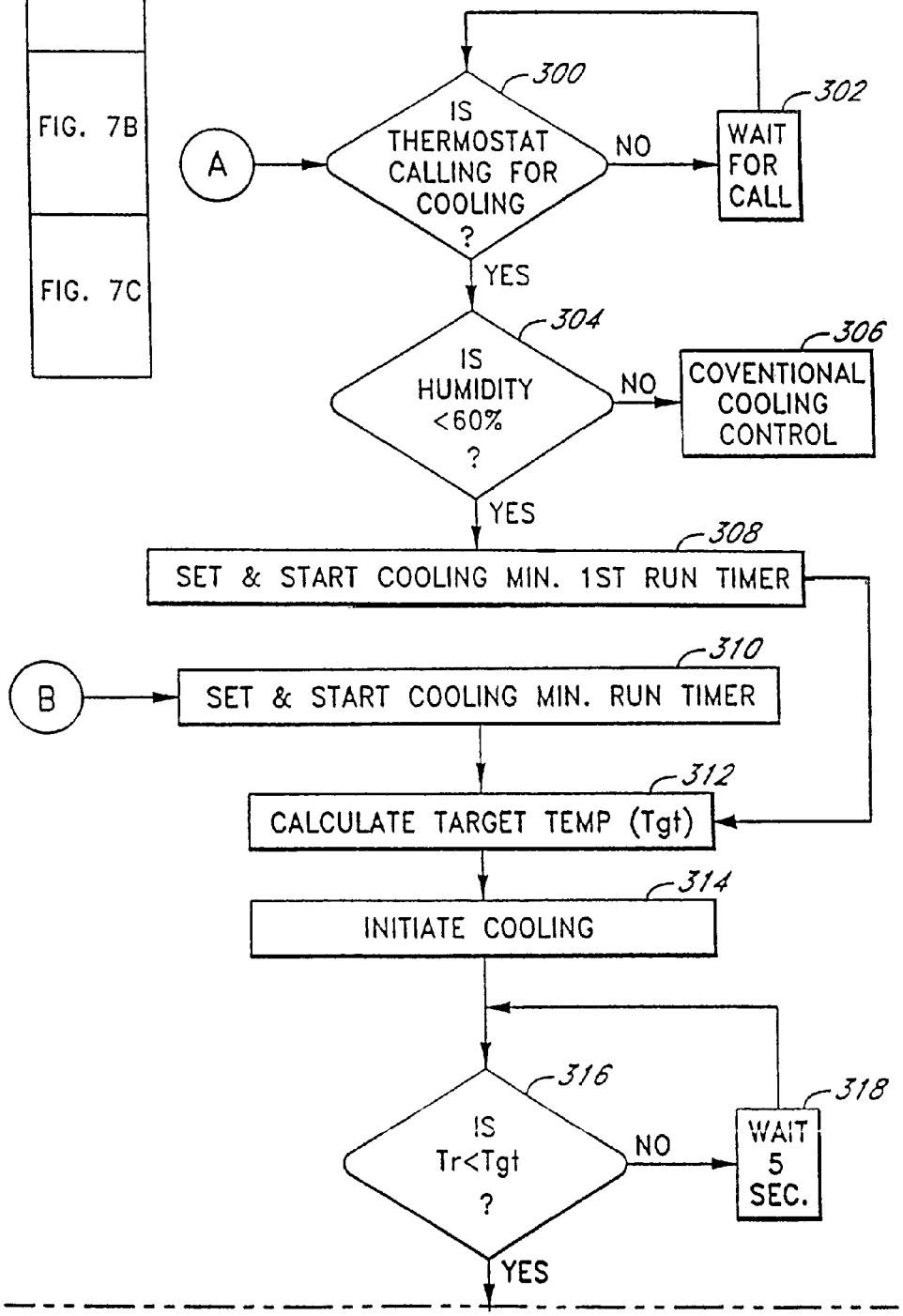

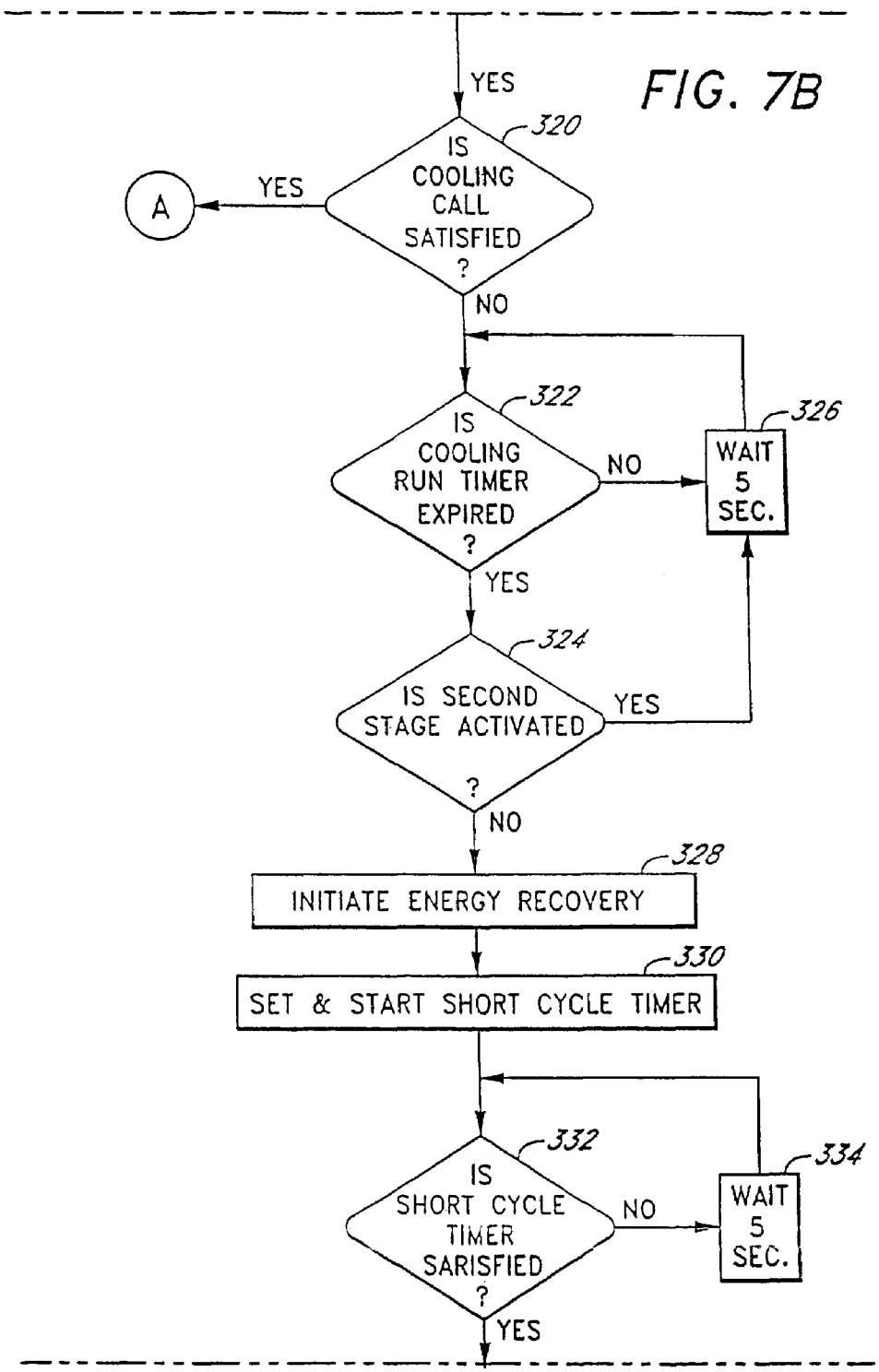

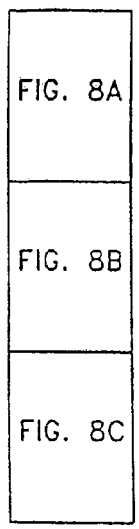
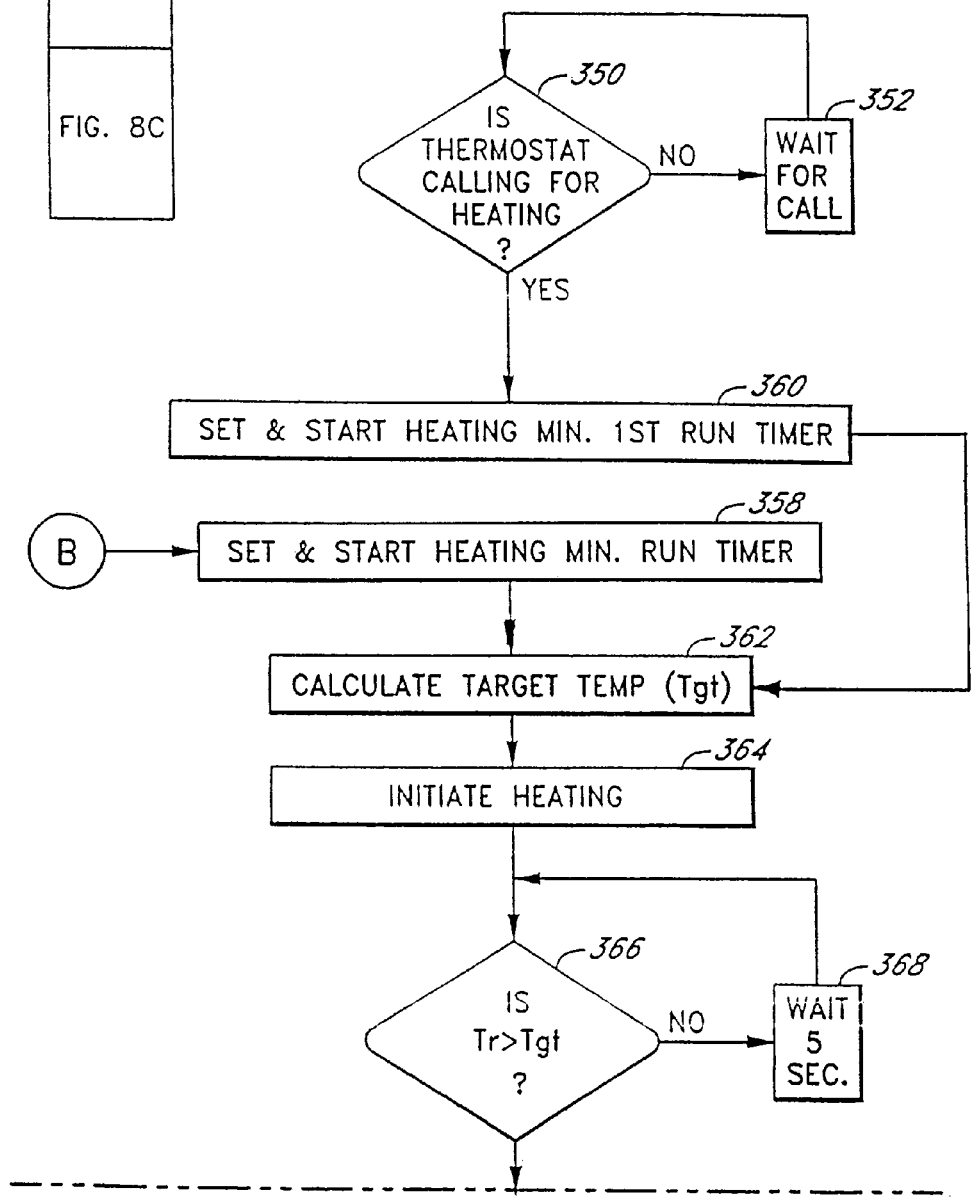
FIG. 8A

METHOD AND APPARATUS FOR ENERGY RECOVERY IN AN ENVIRONMENTAL CONTROL SYSTEM

CROSS REFERENCE TO RELATED APPLICATIONS

This application is a continuation of and claims priority to U.S. patent application Ser. No. 10/688,106, filed on Oct. 17, 2003 now U.S. Pat. No. 6,986,469, which is a continuation of U.S. patent application Ser. No. 10/268,070, filed on Oct. 7, 2002 now U.S. Pat No. 6,637,667; which is a divisional of U.S. patent application Ser. No. 09/746,213, filed on Dec. 22, 2000, now U.S. Pat. No. 6,474,084; which is a continuation of U.S. patent application Ser. No. 09/351,974, filed on Jul. 12, 1999, now U.S. Pat. No. 6,176,436 issued on Jan. 23, 2001; which is a continuation of U.S. patent application Ser. No. 08/933,871, filed on Sep. 19, 1997, now U.S. Pat. No. 6,062,482 issued on May 16, 2000. The contents of U.S. patent application Ser. Nos. 10/268,070, 09/746,213, 09/351,974 and 08/933,871 are hereby incorporated by reference in their entireties.

BACKGROUND OF THE INVENTION

1. Field of the Invention

The present invention relates to controllers for heating, ventilation, and air conditioning (HVAC) systems. More specifically, the present invention relates to dynamic, digitally implemented HVAC control.

2. Related Art

Efforts to manage the environmental condition of a room, building, or other controlled space have resulted in a wide variety of systems for controlling the operation of heaters, air-conditioning compressors, fans, and other components of HVAC equipment. The simplest and most well known form of such control is simply a thermostat which senses the temperature of a controlled space, and sends signals to the HVAC system if the temperature is above or below a particular setpoint. Upon receipt of these signals, the HVAC system supplies cooled or heated air to the space as called for by the thermostat.

Although this simple system is adequate in many instances, improvements have been and are desired. Many aspects of the development of HVAC control apparatus and algorithms focus on increasing occupant comfort by controlling the environmental condition more tightly. A competing concern, however, is minimizing the energy consumed by the HVAC system. It can be appreciated that the various control schemes utilized impact the energy consumption of the HVAC system. In the past, efforts to address excessive energy consumption have focused on determining when a space is unoccupied or otherwise has a lower requirement for environmental control. Examples of these systems include those described in U.S. Pat. No. 4,215,408 to Games, et al., and U.S. Pat. No. 5,395,042 to Riley, et al. In U.S. Pat. No. 4,557,317 to Harmon, Jr., an HVAC controller includes a drifting "dead-band", so that energy consumption is reduced due to the allowance of wider swings in the temperature of the controlled space. In the Harmon, Jr. system, occupant comfort is said to be maintained because the rate of change of the temperature of the controlled space remains low.

One potential source of energy savings has thus far not been fully exploited. This is the minimization of energy loss via heat conduction and radiation through exposed ducting and other components of the HVAC system. This energy loss is exacerbated by the fact that a correctly sized HVAC unit will operate at full capacity only on the hottest or coldest days of the year. The majority of the time, the unit is heating or cooling the supply air to an average temperature which is hotter or colder than that required to meet the demand for environmental control and maintain comfort for the occupants of the controlled space. This overcapacity results in increased heat transfer from the system through ducting and other mechanical components of the HVAC system. Attempts to recover this escaping energy have thus far been limited. One system attempts to recover escaping energy by extending the operating period of the supply air fan beyond that of the furnace or air conditioner. Another system establishes a fixed duty cycle for the furnace or air conditioner by measuring the temperature of the air being supplied to the controlled space.

Although these systems do decrease energy waste somewhat, operator comfort is sacrificed to a degree which can be unacceptable. For one thing, existing systems are not responsive to changes in external conditions which cause changes in the energy needs of the controlled space. Thus, a fixed duty cycle will not be appropriate for optimally satisfying all calls for heating or cooling. In these cases, the controlled space may require an unacceptably long time to heat or cool to a given thermostat setpoint, leaving the occupants uncomfortable for an extended period. Furthermore, HVAC cycling during periods of high demand for heating or cooling may cause noticeable fluctuations in the temperature of the controlled space.

In addition to these factors, existing systems do not adequately provide for humidity control. It is recognized that humidity is a factor in occupant comfort as well as temperature. Accordingly, systems which alter HVAC system operation in response to humidity measurements have been produced. One example of such a system, adapted for controlling the air space inside an automobile, is described in U.S. Pat. No. 4,852,363 to Kampf, et al. This system includes humidifiers and dehumidifiers which are operated in response to a humidity measurement. Another more complex system, also adapted for control of an automotive HVAC system, is described in U.S. Pat. No. 5,579,994 to Davis, Jr. et al. In the Davis, Jr. device, several environmental parameters are sensed, and an overall environmental control strategy is developed which is under fuzzy logic control.

Humidity control may also be performed by cycling an air conditioning unit, as the coils of the air conditioner remove water from the air in addition to cooling it. As described in U.S. Pat. No. 5,346,129 to Shah et al., an air conditioning system can be run in response to relative humidity measurements as well as temperature measurements made in the controlled space. Of course, this may cool the air more than is desired by the occupants of the space, and accordingly, some systems will re-heat the dryer cooled air after it passes the condenser coils.

No presently available system, however, reduces HVAC energy consumption without serious consequences to operator comfort resulting from temperature swings and higher humidity levels.

SUMMARY OF THE INVENTION

An HVAC control apparatus includes input circuitry configured to receive input signals from external sensors, processing circuitry coupled to the input circuitry and configured to evaluate the signals, and output circuitry coupled to the processing circuitry. In this embodiment, the processing circuitry generates output signals which alter the state of the output circuitry. Input/output circuitry comprising a wireless transceiver is also coupled to the processing circuitry for transmitting data to system administrators for diagnostic evaluation of said HVAC system.

Methods of system management are also provided. In one environmental embodiment comprising (1) energy consuming heating and/or cooling components, (2) a digital heating and/or cooling component controller, and (3) system administration facilities, a method of system diagnostics comprises transmitting information relating to the operation of the heating and/or cooling components from the digital controller to system administration facilities via a wireless communication link.

BRIEF DESCRIPTION OF THE DRAWINGS

FIG. 4 is a schematic/block diagram of one embodiment of an HVAC controller according to some aspects of the present invention.

DETAILED DESCRIPTION OF THE PREFERRED EMBODIMENT

Preferred embodiments of the present invention will now be described with reference to the accompanying Figures, wherein like numerals refer to like elements throughout. The terminology used in the description presented herein is intended to be interpreted in its broadest reasonable manner, even though it is being utilized in conjunction with a detailed description of certain specific preferred embodiments of the present invention. This is further emphasized below with respect to some particular terms used herein. Any terminology intended to be interpreted by the reader in any restricted manner will be overtly and specifically defined as such in this specification.

Figure 1:
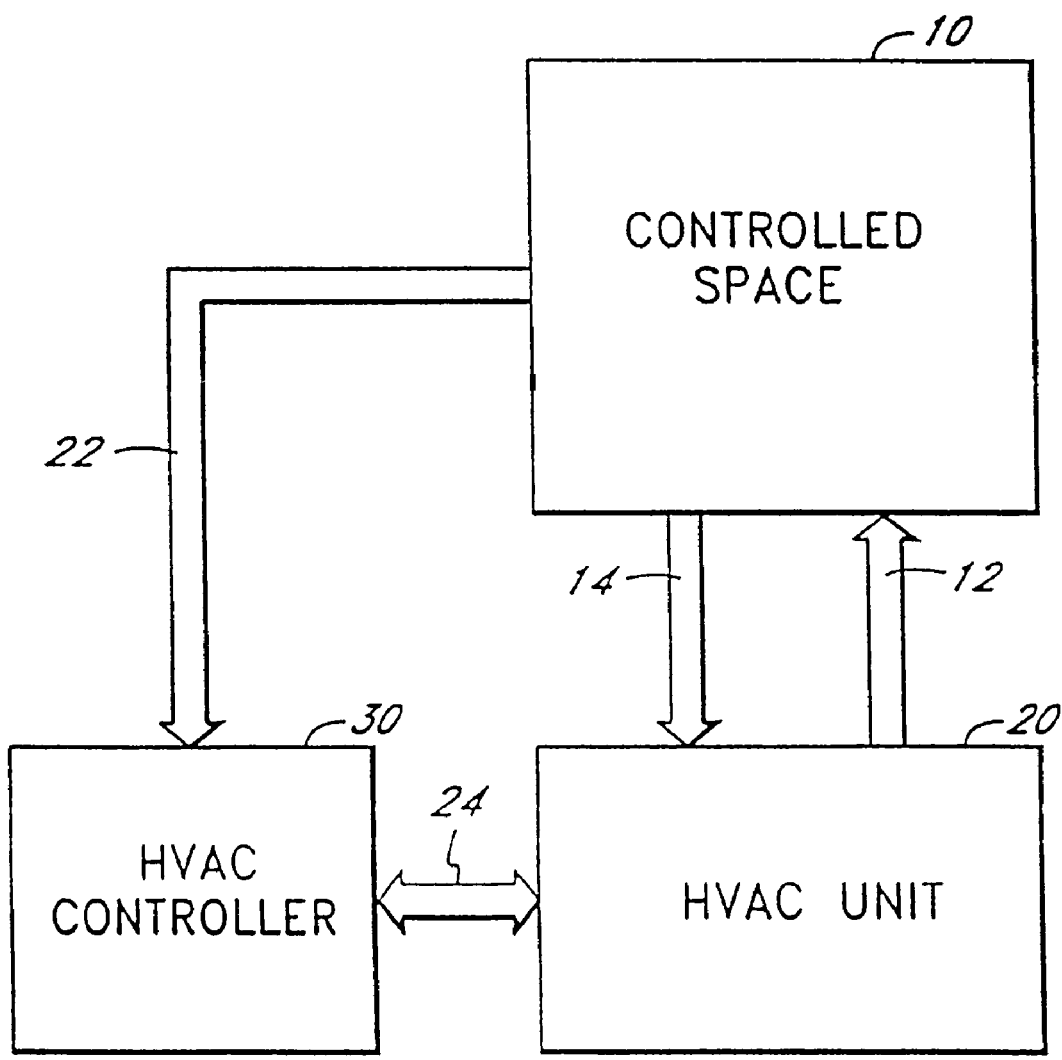
FIG. 1 is a block diagram of an environmental control system according to one embodiment of the present invention.

Referring now to FIG. 1, an environmental control system according to some aspects of the present invention is illustrated. A controlled space 10 receives heated and/or cooled air from a heating, ventilation and air conditioning (HVAC) unit 20. The controlled space may be an automobile interior, an office building, a barn or other animal enclosure, a computer room, or any other space for which environmental control is advantageous. Supply air may flow to the controlled space 10 via an air supply duct 12. Return air from the controlled space 10 is routed back to the HVAC unit 20 via an air return duct 14. The HVAC unit 20 typically comprises an oil or gas furnace for heating the air of the controlled space 10 as well as an air conditioning unit for cooling the air of the controlled space 10. The HVAC unit 20 may also comprise vents and ducting (not shown) for drawing outside air into the system. The HVAC system shown and described herein includes both air heating and air cooling apparatus, and is typical of many common installations. It will be appreciated that the term "HVAC" as used herein also includes stand alone heaters, stand alone air conditioners, heat pumps, and other equipment that perform some or all of the environmental control functions for a controlled space.

Coupled to the HVAC unit 20 is an HVAC controller 30. The HVAC controller 30 may receive information regarding environmental conditions and other information from the controlled space 10 via a sensor signal path 22. The sensor signals may comprise electrical signals from thermocouples, thermistors, electronic humidity sensors, and other sensor types well known to those in the art. The sensor signals may also comprise signals from the controlled space 10 calling for heating, cooling, or providing other information about the condition and needs of the controlled space 10. Another signal path 24 is provided between the HVAC controller 30 and the HVAC unit 20. This signal path preferably includes control signals from the HVAC controller 30, and may further include sensor signals which are routed back to the HVAC controller 20. It can be appreciated that both signal paths are not always necessary to deliver the required information to the HVAC controller 30.

The HVAC controller 30 preferably operates to dynamically control the on/off state of components of the HVAC unit 20 to recover what would be wasted energy during those times when the HVAC unit 20 can meet the demands of the controlled space without operating at maximum capacity. In some embodiments, information concerning the condition of the controlled space and information concerning the condition of the air the HVAC unit 20 is supplying to the controlled space 10 is received by the HVAC controller 30 via one or both signal paths 22 and 24. This information is used to determine whether or not the HVAC unit 20 can meet the heating or cooling demands of the controlled space 10 at a low energy consumption rate while maintaining occupant comfort.

Figure 2:
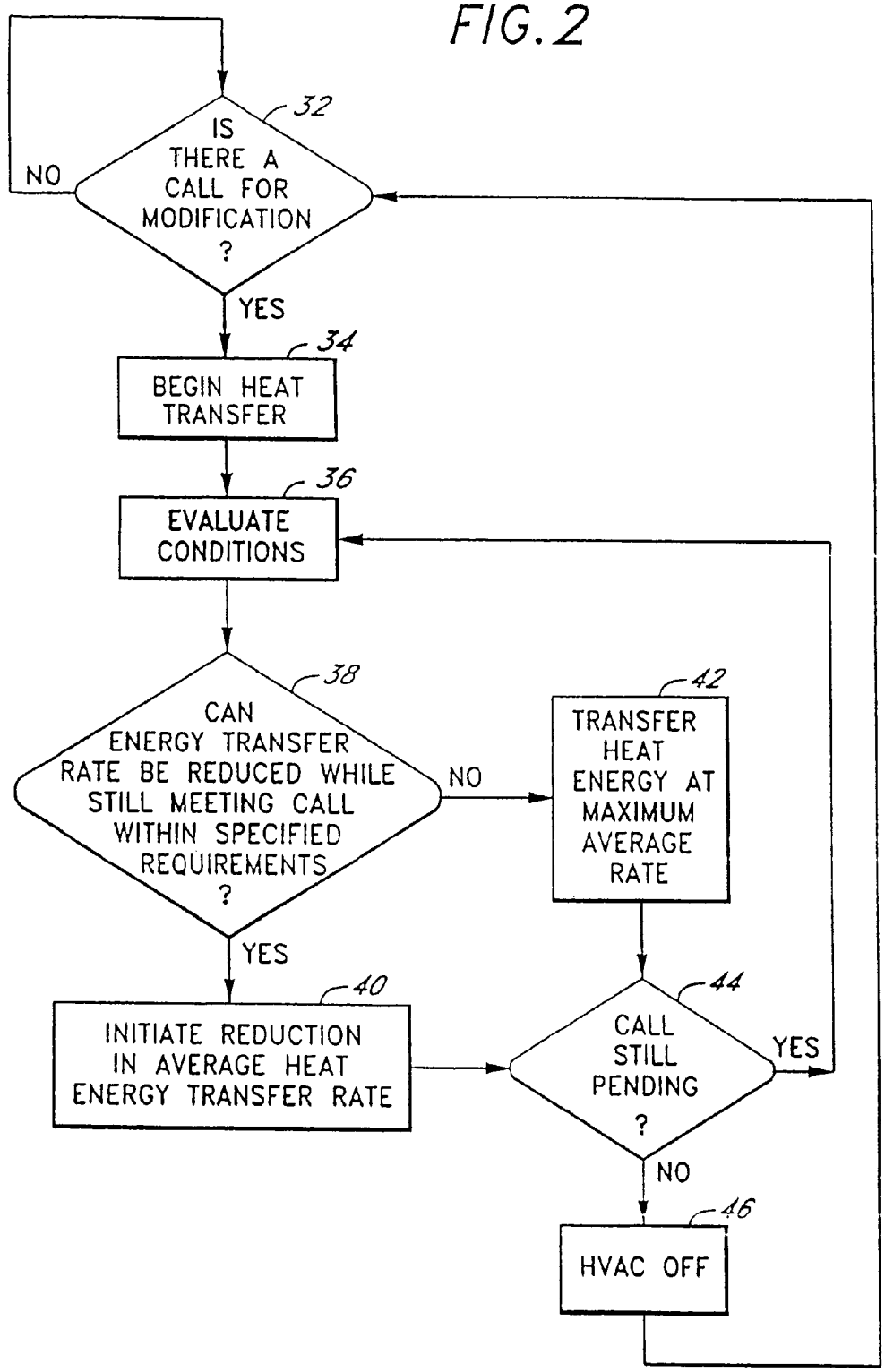
FIG. 2 is a flow chart illustrating the operation of one embodiment of the present invention.

FIG. 2 is a flowchart illustrating one possible mode of operation for an HVAC system as shown in FIG. 1. In the first step 32, the HVAC controller waits for a call for environmental modification from the controlled space 10. This signal may be sent by a thermostat inside the controlled space 10 to the HVAC controller 30 along signal path 22 of FIG. 1. When a call is sensed, heat transfer begins to or from the controlled space at step 34. For example, when a call for heating is received, a gas burning furnace may be started, and heat energy will be transferred to the controlled space by ventilating the controlled space with heated air. When a call for cooling is received, heat energy is transferred from the controlled space to the outside environment by a cooling coil system as is well known in air conditioning systems.

At step 36, the HVAC controller receives and evaluates information regarding conditions in the HVAC system. As will be explained further below, these conditions may advantageously include various environmental and physical conditions and parameters such as the approximate temperature of the controlled space and the rate of change of that temperature, the approximate temperature of the air being supplied to the controlled space and the rate of change of that temperature, the approximate humidity of the controlled space, the length of time the HVAC system has been in an on or off state, the length of time a call for heating or cooling has been pending, etc. Based on the present disclosure, those of skill in the art will appreciate that not all of these parameters need to be evaluated to make or use the present invention. In addition, other parameters not specifically mentioned may be used when, for example, certain parameters are especially relevant to a particular installation. The terms "physical" or "environmental" parameters or conditions are thus intended to include a wide variety of information concerning the operation and status of the HVAC system and related devices and locations, and not simply the several described in detail herein with respect to certain specific embodiments of the present invention. As mentioned above, some or all of this information may be transferred from sensors to the HVAC controller 30 along signal paths 22 and/or 24 of FIG. 1.

The next step 38 involves the determination of whether or not the rate of energy transfer to or from the controlled space can be reduced while meeting the call for environmental change within certain specified requirements. In preferred embodiments, at least some of the requirements are designed to ensure that occupant comfort is not sacrificed to an unacceptable degree when reducing the rate of energy transfer. As will be explained below, however, occupant comfort is not the only consideration at step 38. HVAC system operation requirements such as the prevention of over-cycling an air conditioning compressor may also be considered at step 38. In some advantageous embodiments of the present invention, the decision of step 38 is made based on the evaluation of physical and/or environmental parameters and conditions performed at step 36.

At step 40, if the energy transfer rate can be reduced within the specified requirements, the system will initiate a reduction in the average heat energy transfer rate. In some embodiments, this step will involve shutting off some energy consuming portion of the HVAC system. For example, if the HVAC system is currently cooling the controlled space, the system may turn off the air conditioning compressor and/or outdoor fan. Furthermore, if the HVAC system is currently heating the controlled space, the system may close a valve which supplies gas to a furnace. Most preferably, the HVAC system continues to ventilate the controlled space, even though one or more energy consuming components have been turned off. This continued ventilation is advantageous because while the energy consuming component such as the compressor or outdoor fan is off, the continued ventilation allows heat transfer to continue by recovering energy from system components such as the ducting, other mechanical components of the HVAC system, and structural elements of the controlled space. Thus, energy consumption may be reduced, but useful heat transfer may continue for a certain period of time.

If, on the other hand, the system determines that the energy transfer rate cannot be reduced consistent with certain environmental and/or operational requirements, at step 42 the system will transfer heat energy at the maximum rate. In some embodiments, the decision to transfer heat energy at the maximum rate will be based on considerations such as a very low temperature in the controlled space when heating is called for, a very high temperature in the controlled space when cooling is being called for, or insufficient changes over time in the controlled space temperature when the controlled space is calling for heating or cooling.

As illustrated by step 44 in FIG. 2, system operation also depends on whether or not the call for environmental modification is still pending. If the call is no longer pending, at step 46 the HVAC system will shut down, and the system waits for the next call for environmental modification back up at step 32. If the call is still pending, the physical and environmental conditions of the system are again evaluated at step 36, and a decision at step 38 is made regarding whether or not the energy transfer rate can be reduced or should be set to the maximum rate.

It can be appreciated that at any given instance of executing step 38, the HVAC system may be in a state of reduced or maximum energy transfer depending on the results of any prior evaluations which have been performed, how long the system has been operating, and other factors. Whichever state the system is currently in, however, it is advantageous to conduct frequent reevaluations of the physical and environmental parameters to determine whether or not the current operation mode is optimal. Thus, dynamic control of energy consumption is produced. This in turn allows for increased energy efficiency while maintaining an acceptable level of comfort for occupants of the controlled space.

It will also be appreciated by those of skill in the art that in many embodiments, the steps illustrated in FIG. 2 may be performed in various orders other than that explicitly shown. In addition, the steps 36 and 38 will, in some embodiments, be implemented as an essentially continuous process of comparing sensor inputs to preset limits, and changing the operating mode of the system by performing either step 40 or 42 as indicated when a sensor input signal reaches one of the limits. It may also be noted that many different ways of implementing the two operating modes of steps 40 and 42 may be implemented. For example, step 40 may define an "off" mode for some HVAC components, while step 42 defines an "on" mode for those components. In this case, the duration of each on or off period may vary depending on the values of the physical and environmental parameters sensed at step 36. Alternatively, step 40 could define a mode of operation where the HVAC system enters an on/off cycled mode at a particular duty cycle. In this case, the duty cycle may vary depending on the values of the physical and environmental parameters sensed at step 36. In both of these embodiments, the mode of operation entered into following step 40 is an energy consumption reduction mode. In some embodiments, this mode also comprises an energy recovery mode which increases the overall efficiency of operation of the HVAC system.

Figure 3:
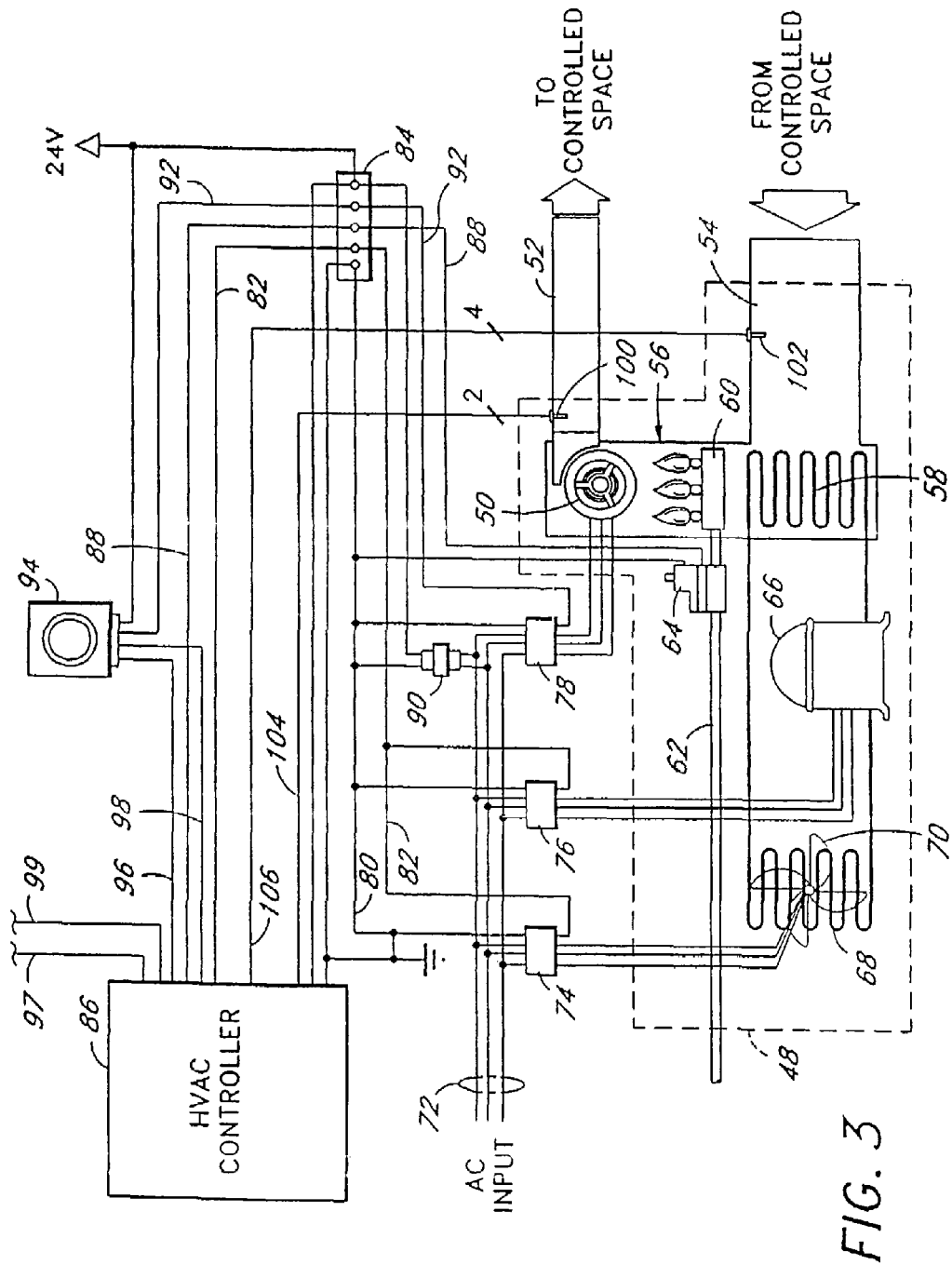
FIG. 3 is a schematic/block diagram of an embodiment of an environmental control system incorporating aspects of the present invention.

FIG. 3 illustrates one specific embodiment of an apparatus constructed according to some aspects of the present invention. In FIG. 3, an HVAC system 48 is shown which comprises several components. A supply air fan 50 (sometimes called an "indoor fan" even though it may actually be mounted outdoors) ventilates a controlled space by forcing air through an air supply duct 52 into a controlled space. The supply air fan 50 also forces ambient air from the controlled space back into the HVAC unit 48 via a return duct 54. In a chamber 56 in the HVAC system 48, this return ambient air may be heated or cooled before it is returned to the controlled space via the air supply duct 52. To accomplish this, the chamber 56 includes air conditioner cooling coils 58 and a gas fired furnace 60. The furnace 60 includes an electrically actuable valve 64 in its gas supply line 62. The cooling coils 58 are coupled to a compressor 66 and heat exchanger coils 68 which are adjacent to a fan 70. These components of the HVAC system may be conventional, and their construction and operation will not be further described herein. Furthermore, it will be appreciated that HVAC systems come in a variety of forms, all of which may be used with the present invention. For example, a given installation may use a split system with separate furnaces and air conditioners. Systems with several heating or cooling stages may also be used. Heat pumps are another form of energy control system that is compatible with the present invention.

The AC power input lines 72 are routed to the components of the HVAC unit 48 through three relays 74, 76, and 78. The relay contacts of relay 74 are connected between the AC power and the fan 70. The relay contacts of relay 76 are connected between the AC power and the compressor 66. The relay contacts of relay 78 are connected between the AC power and the air supply fan 50. One side of the coils of relays 74, 76, and 78 are tied to ground via their common connection to a grounded line 80. The other side of relay coils 74 and 76 are connected to a line 82 which is routed through a terminal block 84 and to an HVAC controller 86, which is illustrated in more detail in FIG. 4. The electrically actuated gas valve 64 also has one line connected to the ground line 80, and another line 88 which is also connected to the HVAC controller 86 through the terminal block 84. Thus, by placing and removing an appropriate voltage on lines 82 and/or 88, the HVAC controller may turn the compressor 66, fan 70, and the gas valve 64 on and off.

Although a power source for this voltage may be created in many different ways known in the art, one convenient method illustrated in FIG. 3 is to use a 24 V output step down transformer 90, which has its input connected to the AC input lines, and its 24 V output connected to the HVAC controller 86 and other system components which require 24 V power.

In addition, the coil of the third relay 78 has one side connected to the ground line 80. The other side of the coil of the relay 78 is connected to line 92, which is routed through the terminal block 84 and to a thermostat 94. The thermostat 94 is typically mounted in the controlled space. Thus, a thermostat output signal may directly control the operation of the supply air fan 50, without modification or interruption by the controller 86. In typical systems, the thermostat will activate the indoor fan 50 continuously for the entire duration of any call for heating or cooling.

As will also be described in more detail with reference to FIG. 4, the HVAC controller receives signals from the thermostat 94 or other remote device on lines 96 and 98. Through these signal lines 96, 98, the HVAC controller receives calls for heating and cooling from the controlled space. Other information may also be transferred through, as one example, additional lines 97, 99. These two lines may be provided to indicate whether or not second stage heating or cooling has been activated by the system. Additional signals representative of other system parameters may also be provided. The response of the system to these signals is described in relation to specific embodiments of the present invention in more detail below with reference to FIGS. 5 through 8.

The HVAC controller also receives signal inputs from sensors. One sensor 100 may be located in the air supply duct 52. In some embodiments, this sensor 100 has an output signal representative of the approximate temperature of the air being supplied to the controlled space by the HVAC system. This output signal is routed to the HVAC controller via line 104. The output signal may advantageously comprise a two-wire thermistor or thermocouple signal.

A second sensor 102 may be located in the return duct 54. This sensor 102 preferably has an output signal representative of the approximate temperature of the ambient air returning from the controlled space. Also, the sensor 102 may sense the approximate humidity of the ambient air returning from the controlled space, and have a second output signal representative of this parameter. This output signal, which may advantageously comprise a four wire interface to the HVAC controller, two for the thermistor or thermocouple and two for the humidity sensor, is routed to the HVAC controller on line 106. In addition, the sensor 102 may comprise a carbon monoxide sensor. In this case, the HVAC controller can be made to signal an audible alarm and/or shut off gas flow to the furnace 60 if excessive carbon monoxide levels are sensed.

It will be appreciated that the sensors 100 and 102 may be located in locations different from that shown and still perform the function required. As a specific example, the sensor 102 could be located in the controlled space itself to measure the ambient temperature and humidity. The temperature in the return air duct is simply a convenient substitute or proxy for this usually more remote location.

FIG. 4 provides a more detailed illustration of the HVAC controller 86 shown in FIG. 3. In this embodiment, the HVAC controller comprises a microprocessor 120. The term "microprocessor" in this application is intended to include any of a variety of digital processor configurations, including the commercially available microprocessors such as the X86 family from Intel. In many preferable embodiments, the microprocessor is a commercially available microcontroller or digital signal processor available, for example, from Motorola or Texas Instruments.

The microprocessor 120 is coupled to the sensor inputs 104 and 106 through analog signal conditioning and optical isolation circuitry 122 and an analog to digital converter 124 to provide digitized data representative of the environmental conditions sensed by the sensors 100, 102. The microprocessor 120 is also coupled to inputs 96, 97, 98, 99 from a thermostat in the controlled space or another remote device. In some advantageous embodiments, these signals comprise two level inputs, i.e. ground and a nominal voltage, typically 24 VAC, or perhaps 5 Vdc for a digital system. For example, a call for cooling will be indicated by line 96 being asserted by being pulled to the nominal voltage. A call for heating will be indicated by line 98 being asserted by being pulled to the nominal voltage. Analogously, assertion of line 97 may indicate that secondary cooling has been activated, and assertion of line 99 may indicate that secondary heating has been activated. These signals are coupled to the microprocessor 120 through signal conditioning circuitry 126. In some embodiments, these signals may be operable to interrupt microprocessor operation. In this case, whenever lines 96 or 98, for example, are unasserted, the processor senses that no call for heating or cooling is being made, and therefore halts any ongoing control operation and waits for the next call to re-initiate control over the HVAC system components.

The microprocessor 120 is also coupled to a memory 128. This memory may store previously received digital data obtained from the inputs 96, 97, 98, 99, 104, and 106, the time at which such data was received, the length of time the compressor or furnace has been on or off, and other information relevant to HVAC operation. Some of this information may be produced at least in part by a timer 121 implemented within the microprocessor or as a discrete clock device. In many advantageous embodiments, the timer 121 will not generate an absolute real time, but will be configured to measure time spans relative to some prior event such as the initiation of a call for heating or cooling. Also stored in memory 128 are predetermined setpoints against which such data is compared to make decisions regarding HVAC operation. It can be therefore appreciated that the memory 128 advantageously may include a non-volatile portion such as EEPROM memory as well as RAM memory. EEPROM may be advantageous in that no backup battery is required.

The microprocessor further interfaces with an I/O port 130 for communicating information about the environmental and physical parameters being monitored, and the status of the HVAC system. This information is valuable to system administrators in evaluating system performance and in troubleshooting system malfunctions. In addition, the microprocessor can be re-programmed by altering stored setpoints via the I/O port 130. The I/O port 130 may advantageously comprise an RS232 serial port well known to those in the art to make communication with widely available personal computers and handheld palmtop computers convenient. If desired, the I/O port may comprise a wireless transceiver, and/or may interface to a modem for system monitoring and control via RF and/or telephone communication links.

The microprocessor 120 may additionally include two outputs 132, 134 which, after some buffering, drive the coils of two normally closed output relays 136, and 138 respectively. The contact of one of these relays 136 is configured to output the thermostat heating call line 98 to the output line 88 (see FIG. 3) which controls the gas valve 64. The contact of the other relay 138 is configured to output the thermostat cooling call line to the output line 82 (see FIG. 3) which controls the compressor 66 and fan 70. Thus, the operation of the gas valve 64, the compressor 66, and the fan 70 may be controlled by the microprocessor 120 by selectively opening the contacts of the relays 136, 138. In the embodiment of FIG. 4, the normally closed relays 136 and 138 ensure normal operation of the HVAC system if the controller is powered down or is otherwise non-operational. In this case, the heating and cooling calls pass through the relays 136, 138, and actuate the compressor, fan, and furnace as in a conventional HVAC system.

Although more detail is provided below with regard to specific implementations of controller operation, certain fundamental properties can be appreciated from examination of FIGS. 3 and 4. For instance, the microprocessor 120 may be configured to take digital data representative of environmental and physical conditions, make operational decisions based on those conditions, and dynamically control the on/off state of energy consuming components such as the compressor 66 and furnace 60 based on the operational decisions made. The digitally based decision making allows for a wide variety of sensor inputs on which to base operational decisions. The HVAC controller can also be conveniently programmed via the I/O port for easy customization to different systems and alterations to existing installations.

It can be appreciated that many alternative methods of system control can be used to improve HVAC efficiency by monitoring physical and environmental parameters of the system and the associated controlled space. In FIGS. 5 through 8, specific implementations of dynamically controlled energy recovery during heating and cooling calls are illustrated. The implementations shown may be advantageously produced with appropriate configuration, via programming, of the microprocessor of FIG. 4. In the discussion below with reference to these Figures, several specific time periods, setpoints, and other parameters are described. Although the specific parameters mentioned have been found suitable, it will be appreciated that a wide variety of options for these parameters are possible within the scope of the present invention. Furthermore, for clarity of explanation, some of the steps set forth below are described in terms of operations of the apparatus of FIGS. 3 and 4. This apparatus is advantageous in implementing the described control procedures, but it will be appreciated that many different types of physical hardware may be used to perform the functions described.

Figure 5A:
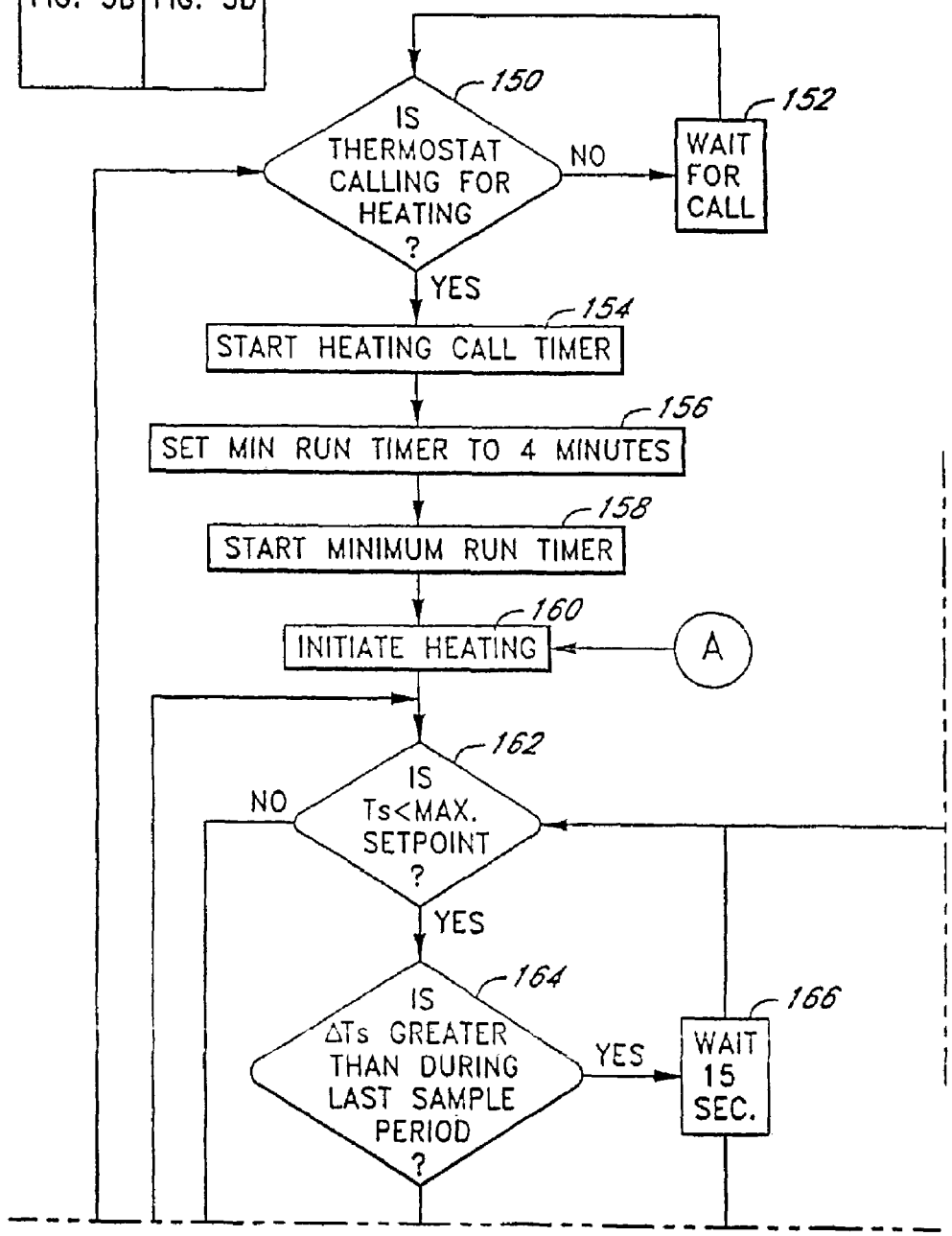
FIG. 5 is a composite of FIGS. 5A, 5B, 5C, and 5D, and is a flowchart illustrating the operation of one embodiment of the present invention during a call for heating from a controlled space.
Figure 5B:
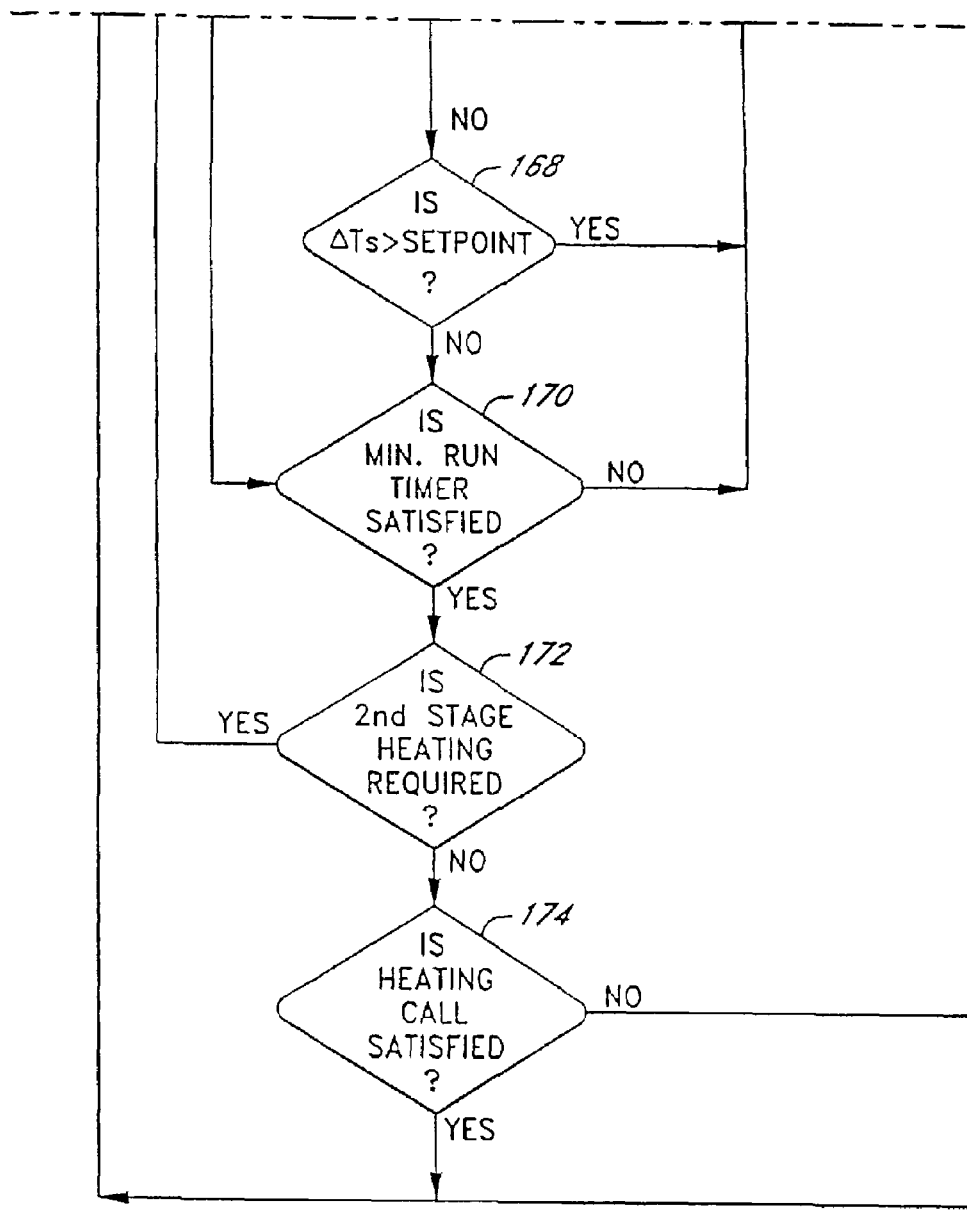

One implementation of actions during a call for heating are illustrated in FIG. 5, beginning at step 150 of FIG. 5A, where the controller determines whether a heating call is being made. If not, the system waits for a call at step 152. Once a call for heating has been made, the controller then initiates a heating call timer at step 154 to keep track of how long this particular call for heating has been pending. This measurement may be used later in the HVAC control process. Also, at step 156, the system sets a minimum run timer to four minutes and starts the minimum run timer at step 158. Heating is initiated at step 160 by asserting line 88 of FIGS. 3 and 4 to open the gas valve 64. It will be appreciated that step 160 is performed immediately upon receipt of the call for heating when apparatus in accordance with FIG. 4 is utilized as an HVAC controller. This is because the normally closed relay 138 sends the call to the gas valve when it is received.

Once heated air begins flowing to the controlled space, the controller monitors the approximate air supply temperature $T_s$, and compares it to a predetermined maximum setpoint, which will typically be in the range of 120 to 140 degrees Fahrenheit. As it generally takes some time for the supply air temperature to reach this value, this comparison initially results, at step 162, in a decision that the supply air temperature is less than the setpoint. In this case, at step 164, the controller then compares the rate of change of $T_s$ with its most recent past value. If the rate of change of $T_s$ has increased, the controller takes no action, waiting for 15 seconds at step 166, and loops back up to step 162 to again compare the supply air temperature with the predetermined maximum setpoint. If the rate of change of $T_s$ is not increasing, at step 168 of FIG. 5B, the controller compares the rate of change of $T_s$ with another predetermined setpoint, which may be set at approximately 0.5 to 5 degrees Fahrenheit per minute. If the rate of change of $T_s$ is more than this setpoint, the controller again performs no action and waits 15 seconds at step 166. If $T_s$ is greater than its setpoint, or the rate of change of $T_s$ is less than its setpoint, at step 170 the controller checks if the minimum run timer started at step 158 has timed out. If not, the controller again waits 15 seconds at step 166. Thus, after initiating heating, the controller performs no action until the minimum run timer has timed out, and either $T_s$ is above its setpoint, or the rate of change of $T_s$ is below its setpoint. The minimum run timer thus ensures that the heating continues in an on state for at least an amount of time which is consistent with the manufacturers' specifications.

Once these conditions are met, the controller determines at step 172 whether or not it is receiving a signal indicating that secondary heating is also being utilized in a two stage HVAC system. This information may be received on line 99 of FIG. 4 for example. If secondary heating has been activated, it indicates that no reduction in energy transfer for the first stage coupled to the controller should take place. The controller will therefore, if second stage heating is required to satisfy the call, loop back to continue monitoring $T_s$ and its rate of change.

At step 174, the controller checks to see if the call is still pending. If not, the heat transferred has satisfied the call, and heating should be discontinued. In control systems implemented with apparatus constructed as shown in FIG. 4, it can be seen that as soon as the call from the thermostat is satisfied, operation of the furnace will stop, because the call signal on line 98 will no longer be present to be routed to the gas valve through the associated relay 138. As also described above with respect to the apparatus of FIG. 4, the step of checking for pending calls may be implemented by interrupting processor operation when deassertion of, for example, line 98 is sensed by the microprocessor.

Figure 5C:
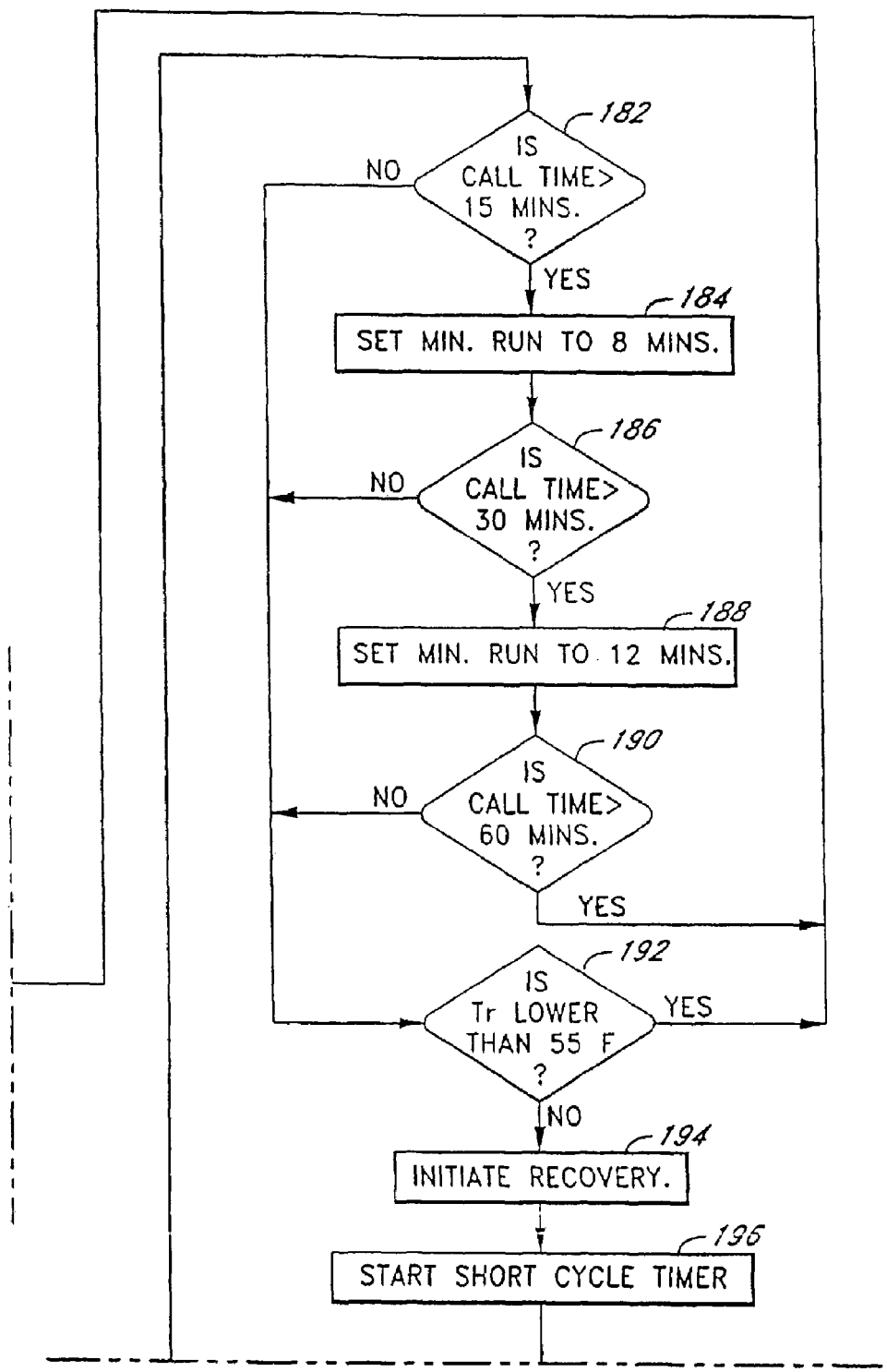

If, however, at step 174 it is determined that the call is still pending, the controller evaluates the amount of time the call has been pending. Referring now to FIG. 5C, if at step 182 it is determined that the call has been pending for more than 15 minutes, at step 184 the minimum run timer is reset to eight minutes. If, at step 186, it is determined that the call has been pending for more than 30 minutes, at step 188 the minimum run timer is reset to twelve minutes. If, at step 190, it is determined that the call has been pending for more than 60 minutes, at step 192 the controller will loop back to step 162 to continue monitoring $T_s$ and its rate of change, thereby avoiding entering a mode of reduced energy consumption.

As mentioned above, the minimum run timer is initially set to four minutes, so in the beginning, the pending call time will likely not satisfy the 15, 30, and 60 minute tests defined in steps 182, 186, and 190, unless other requirements such as are imposed on the supply air temperature were not met in a short time after cooling began. The controller will therefore likely not initially reset the minimum run timer, and at step 192, checks the ambient air temperature of the space by looking at $T_r$, the temperature of the air in the return duct. If this temperature is lower than 55 degrees F, the controller again loops back to step 162 to continue monitoring $T_s$ and its rate of change. However, if $T_r$ is greater than 55 degrees F, the controller will initiate energy recovery mode at step 194. This step of comparing $T_r$ with a fixed value allows the system to inhibit energy recovery when the thermostat setpoint is far different from the actual temperature of the controlled space. The HVAC unit will thus operate at maximum output until the temperature of the controlled space reaches a more comfortable value.

Referring back to FIGS. 3 and 4, in this embodiment the entering of energy recovery mode may involve simply the opening of the valve 64 by opening the relay 98 to remove the call signal from line 88. This reduces the energy consumption of the HVAC unit dramatically. However, the supply air fan remains operational, so that air can continue to flow through the system, drawing heat from system components that would otherwise be radiated or conducted away and lost. As shown by FIG. 5, this energy recovery step 194 is taken if (1) the minimum run timer is satisfied, (2) either $T_s$ is greater than its maximum setpoint or the rate of change of $T_s$ is less than its minimum setpoint, and (3) the temperature of the controlled space is greater than 55 degrees F. Otherwise, the heating initiated at step 160 is continued.

Following the initiation of recovery at step 194, the short cycle timer is started at step 196. Once recovery is initiated at step 194 and the furnace is off, the air in the supply duct begins to cool off, and to draw heat from the ducting material, other mechanical components of the HVAC system, and structural components of the controlled space. This energy recovery continues as the supply air temperature drops toward the ambient temperature, and the controller will wait until certain conditions are met before re-initiating heating.

Figure 5D:
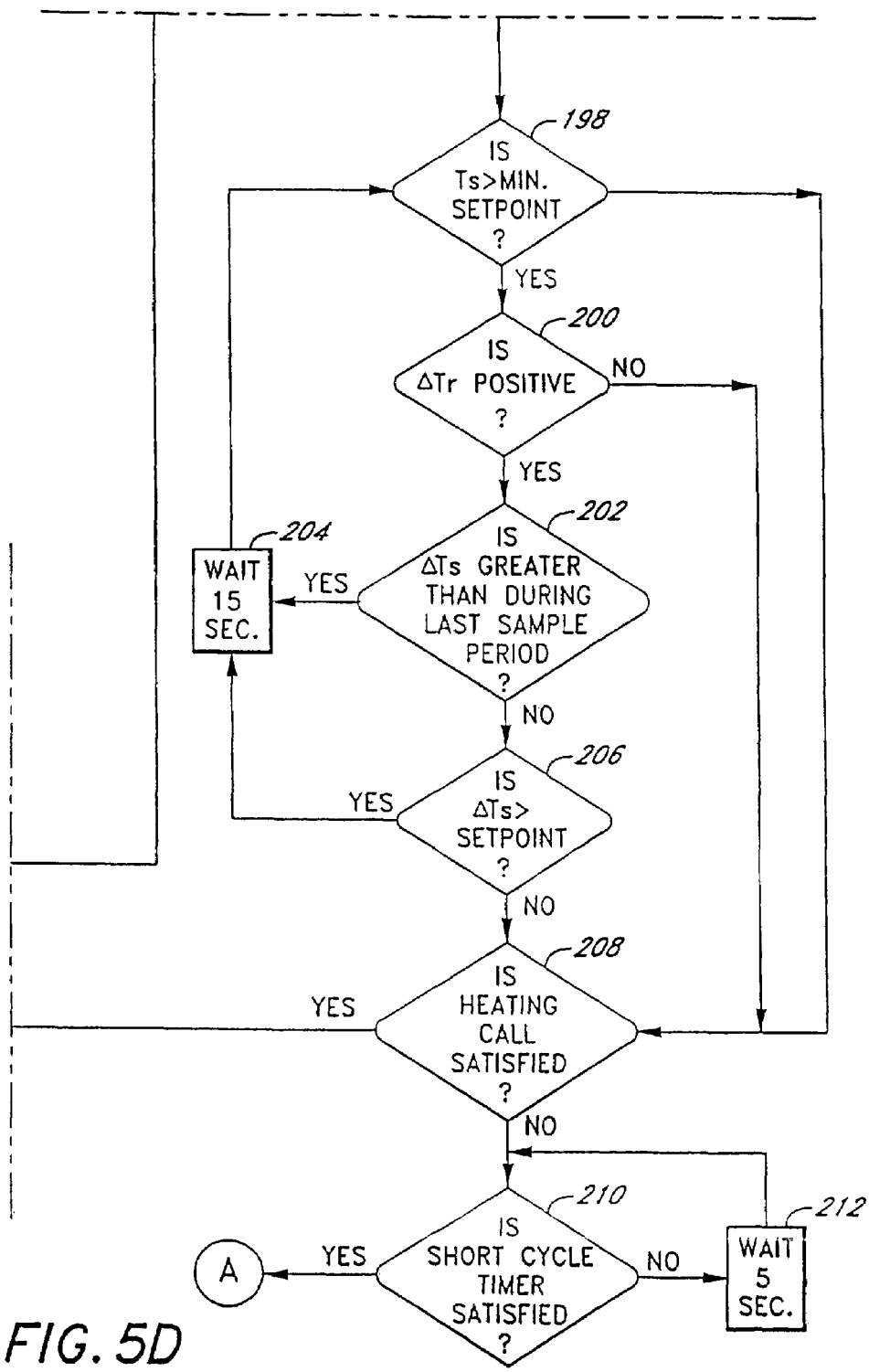

Therefore, at step 198 of FIG. 5D, the controller then determines whether or not the supply air temperature is above a minimum setpoint, typically set at 90 to 100 degrees F. If it is, the controller then checks, at step 200, if the rate of change of the temperature of the controlled space is positive, that is, is the controlled space still getting warmer. If it is, the controller moves to step 202, and determines if the rate of change (in the negative direction this time) of the supply air temperature has increased over that previously recorded. If it has, the controller takes no action, and waits 15 seconds at step 204 before looping back to step 198 and re-checking the supply air temperature.

If the rate of change is not decreasing, the controller then checks at step 206 if the rate of change of the supply air temperature is greater than a predetermined setpoint, which may advantageously be set at 0.5 to 5 degrees F per minute. If it is, the controller again takes no action, and waits 15 seconds at step 204 before looping back to step 198 and re-checking the supply air temperature.

If any one of these three conditions hold: (1) at step 198 $T_s$ is less than the minimum setpoint, (2) at step 200 the controlled space is no longer increasing in temperature, or (3) the rate of change of $T_s$ is less than a predetermined setpoint, then the controller will move out of this 15 second increment waiting loop and first check at step 208 to see if the call for heating is still pending. If the heating call has been satisfied (i.e., the call is no longer pending), the system loops up to state 150, and waits for the next call. If the heating call has not been satisfied, heating should be re-initiated. In this case, the short cycle timer, which was started at step 196, is checked at step 210 to see if it is timed out. If not, the controller then waits, in five second increments illustrated by step 212, for the short cycle timer to time out. When it has been determined that the short cycle timer timed out at step 210, the controller loops back to step 160 and reinitiates a heating cycle by turning the gas valve for the furnace back on, by, for example, allowing the relay 138 to close, and outputting the call signal on line 88 again.

FIG. 6 illustrates a specific implementation of energy recovery during a cooling call according to aspects of the present invention. Once again, the implementation shown is advantageously produced with appropriate configuration, via programming, of the microprocessor of FIG. 4. Many parallels to the heating flowchart of FIG. 5 will be apparent, although some differences exist.

Actions during a call for cooling are illustrated in FIG. 6, beginning at step 220 of FIG. 6A, where the controller determines whether a cooling call is being made. If not, the system waits at step 222. Once a call for cooling has been made, the controller then initiates a cooling call timer at step 224 to keep track of how long this particular call for cooling has been pending. This measurement may be used later in the HVAC control process. Also, at step 226, the system sets a minimum run timer to four minutes and starts the minimum run timer at step 228. Cooling is initiated at step 230 by asserting line 82 of FIGS. 3 and 4 to turn on the compressor 66 and fan 70. It will be appreciated that step 230 is performed immediately upon receipt of the call for cooling when apparatus in accordance with FIG. 4 is utilized as an HVAC controller. This is because the normally closed relay 136 sends the call to the compressor and outdoor fan when it is received.

Once cooled air begins flowing to the controlled space, the controller monitors the approximate air supply temperature $T_s$, and compares it to a predetermined minimum setpoint, which will typically be in the 50 to 60 degrees Fahrenheit range. As it generally takes some time for the supply air temperature to reach this value, this comparison initially results, at step 232, in a decision that the supply air temperature is greater than the setpoint. In this case, at step 234, the controller then compares the rate of change of $T_s$ with its most recent past value. If the rate of change of $T_s$ increased, the controller takes no action, waiting for 15 seconds at step 236, and loops back up to step 232 to compare the supply air temperature with the predetermined minimum setpoint. If the rate of change of $T_s$ is not increasing, at step 238 of FIG. 6B the controller compares the rate of change of $T_s$ with another predetermined setpoint, typically set at 0.5 to 5 degrees Fahrenheit per minute. If the rate of change of $T_s$ is more than this setpoint, the controller again performs no action and waits 15 seconds at step 236.

If either $T_s$ is greater than its setpoint, or the rate of change of $T_s$ is less than its setpoint, at step 240 the approximate humidity of the controlled space may be checked. If this humidity is greater than a maximum setpoint, the controller again waits 15 second and loops back to step 232. Cooling will thus continue at maximum output during high humidity periods. If the humidity is lower than the setpoint, the controller determines at step 242 whether or not it is receiving a signal indicating that secondary cooling is also being utilized in a two stage HVAC system. This information may be received on line 97 of FIG. 4 for example. If secondary cooling has been activated, it indicates that no reduction in energy transfer for the first stage coupled to the controller should take place. The controller will therefore, if second stage cooling is required to satisfy the call, loop back to continue monitoring $T_s$ and its rate of change.

If second stage cooling is not activated, the status of the call for cooling is checked at step 244. If the heat transferred has satisfied the call, cooling should be discontinued. In control systems implemented with apparatus constructed as shown in FIG. 4, it can be seen that as soon as the call from the thermostat is satisfied, operation of the compressor and fan will stop, because the call signal on line 96 will no longer be present to be routed to the compressor 66 and fan 70 through the associated relay 136. The system thus loops back to step 220 and awaits the next call for cooling. As also described above with respect to the apparatus of FIG. 4, the step of checking for pending calls may be implemented by interrupting processor operation when deassertion of, for example, line 96 is sensed by the microprocessor.

Moving back to step 244, if the cooling call has not been satisfied, the controller waits for the minimum run timer to time out by checking its status at step 256, and waiting in five second increments at step 258 until the minimum run timer has timed out. The minimum run timer ensures that the compressor operates for a time at least as long as suggested by the compressor manufacturer before entering a recovery cycle.

Figure 6B:
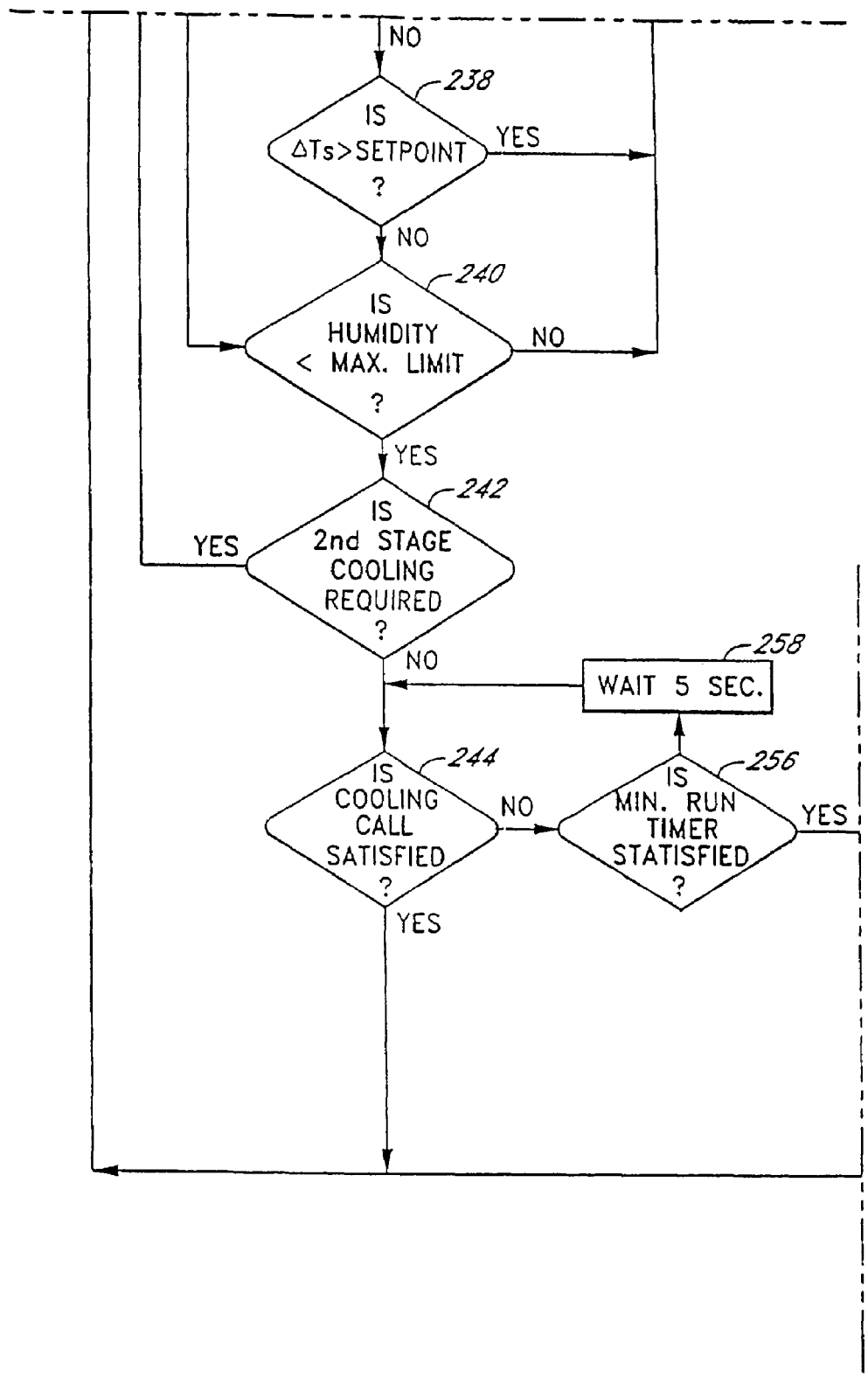
FIG. 6 is a composite of FIGS. 6A, 6B, 6C, and 6D, and is a flowchart illustrating the operation of one embodiment of the present invention during a call for cooling from a controlled space.
Figure 6C:
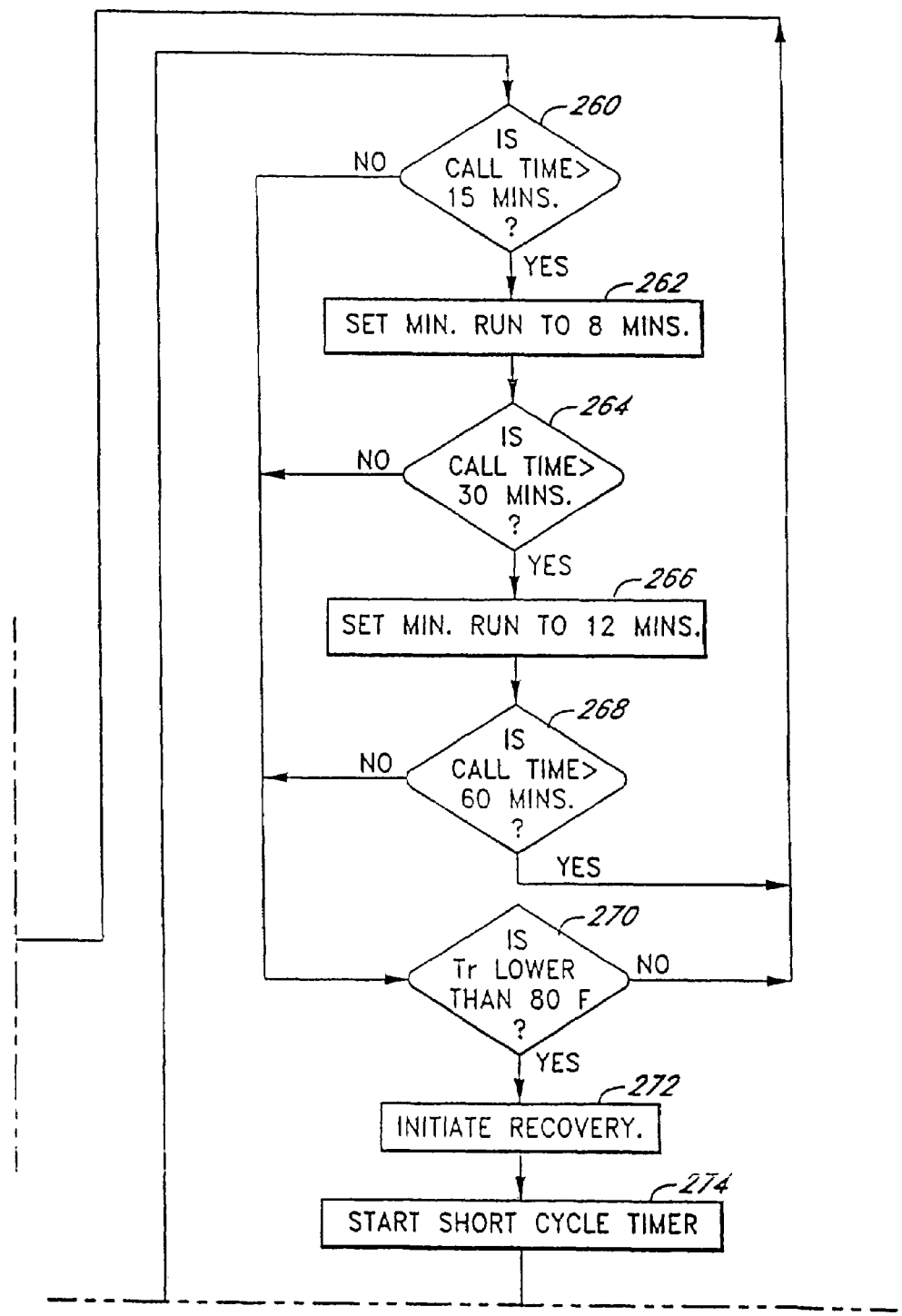

Once the minimum run timer has expired, the controller moves to step 260 of FIG. 6C and evaluates the amount of time the call has been pending. If, at step 260, it is determined that the call has been pending for more than 15 minutes, at step 262 the minimum run timer is reset to eight minutes. If, at step 264, it is determined that the call has been pending for more than 30 minutes, at step 266 the minimum run timer is reset to twelve minutes. If, at step 268, it is determined that the call has been pending for more than 60 minutes, the controller will loop back to step 232 to continue monitoring $T_s$ and its rate of change, bypassing entry into an energy recovery mode.

As mentioned above, the minimum run timer is initially set to four minutes, so in the beginning, the pending call time will likely not satisfy the 15, 30, and 60 minute tests defined in steps 260, 264, and 268, unless other requirements such as are imposed on the supply air temperature were not met in a short time after cooling began. The controller will therefore likely not initially reset the minimum run timer, and at step 270, checks the ambient air temperature of the controlled space by looking at $T_r$, the temperature of the air in the return duct. If this temperature is higher than 80 degrees F, the controller again loops back to step 232 to continue monitoring $T_s$ and its rate of change. However, if $T_r$ is less than 80 degrees F, the controller will initiate energy recovery mode at step 272. In this case as well, recovery mode is not entered if the temperature of the controlled space is uncomfortable.

Referring back to FIGS. 3 and 4, in this embodiment energy recover mode may involve simply the shutting down of the compressor 66 and fan 70 by removing the cooling call signal from line 82 by opening the associated relay 136. This reduces the energy consumption of the HVAC unit dramatically. However, the supply air fan remains operational, so that air can continue to flow through the system, losing heat to system components that would otherwise remain in the controlled space which is being cooled. As shown by FIG. 5, this step 272 is taken if (1) the minimum run timer is satisfied, (2) either $T_s$ is less than its minimum setpoint or the rate of change of $T_s$ is less than its minimum setpoint, and (3) the temperature of the controlled space is less than 80 degrees F. Otherwise cooling initiated at step 230 is continued.

Following the initiation of recovery at step 272, the short cycle timer is started at step 274. Once recovery is initiated and the compressor 66 is off, the air in the supply duct begins to warm, and to lose heat to the cold ducting material, other mechanical components of the HVAC system, and structural elements of the controlled space. Energy recovery thus continues as the supply air temperature warms toward the ambient temperature, and the controller will wait until certain conditions are met before re-initiating cooling.

Figure 6D:
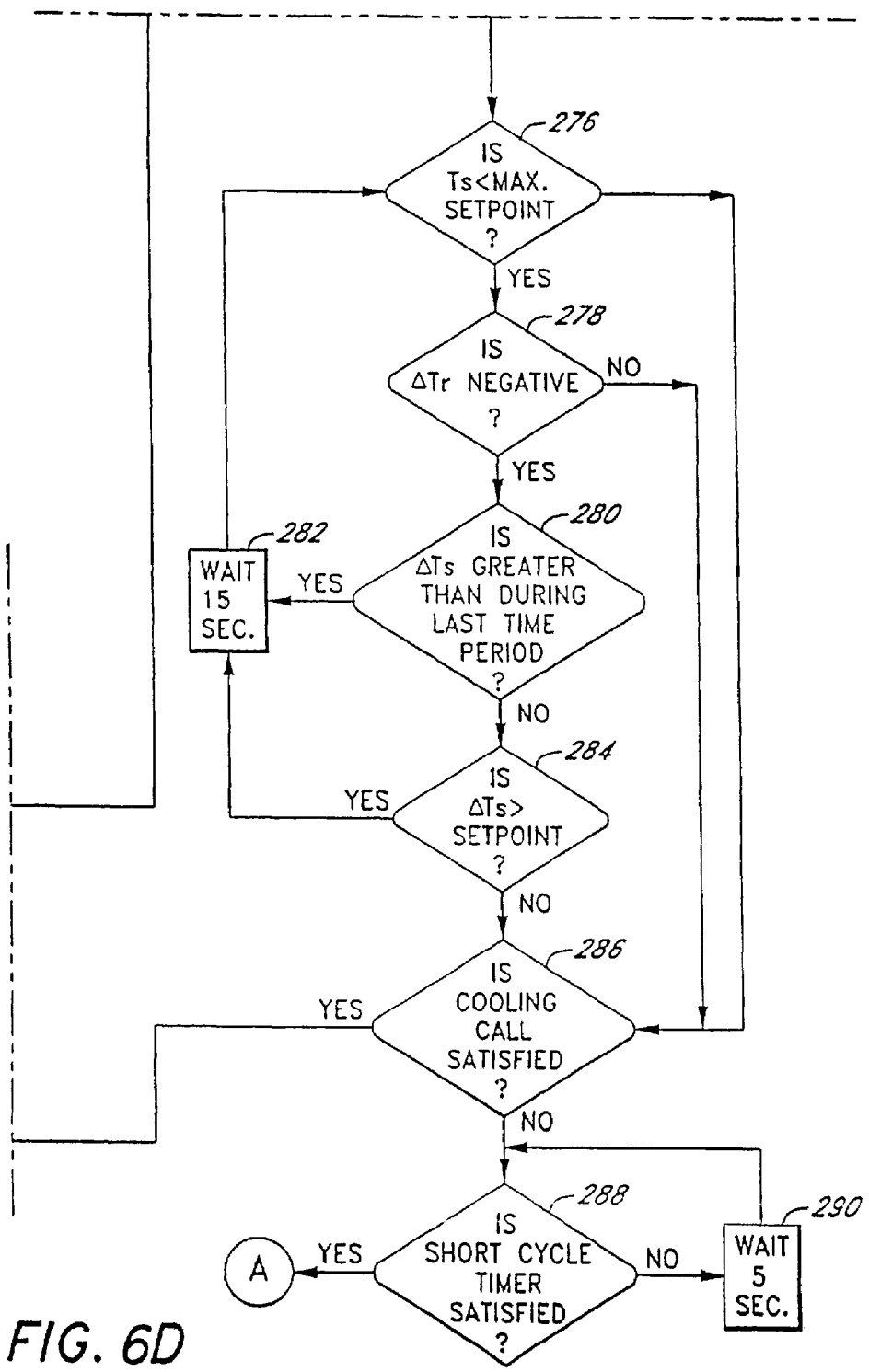

Referring now to FIG. 6D, at step 276 the controller then determines whether or not the supply air temperature is below a maximum setpoint, typically set at 60 to 70 degrees F. If it is, the controller then checks, at step 278, if the rate of change of the temperature of the controlled space is negative, that is, is the controlled space still getting cooler. If it is, the controller moves to step 280, and determines if the rate of change (in the positive direction this time) of the supply air temperature has increased over that previously recorded. If it has, the controller takes no action, and waits 15 seconds at step 282 before looping back to step 276 and re-checking the supply air temperature.

If the rate of change is not decreasing, the controller then checks at step 284 if the rate of change of the supply air temperature is greater than a predetermined setpoint, which may be set at 0.5 to 5 degrees per minute. If it is, the controller again takes no action, and waits 15 seconds at step 282 before looping back to block 276 and re-checking the supply air temperature.

If any one of these three conditions hold: (1) at step 276 $T_s$ is more than the maximum setpoint, (2) at step 278 the controlled space is no longer decreasing in temperature, or (3) the rate of change of $T_s$ is less than a predetermined setpoint, then the controller will move out of this 15 second increment waiting loop and first check at step 286 to see if the call for cooling is still pending. If the cooling call has been satisfied (i.e., the call is no longer pending), the controller loops back to block 220 to wait for the next call for cooling. If the cooling call has not been satisfied, cooling should be re-initiated. In this case, the short cycle timer, which was started at step 274, is checked at step 288 to see if it is timed out. If not, the controller then waits, in five second increments illustrated by step 290, for the short cycle timer to time out. When it has been determined that the short cycle timer timed out at step 288, the controller loops back to step 230 and reinitiates a cooling cycle by turning the air conditioning compressor back on, by, for example, allowing the relay 138 to close, and outputting the call signal on line 88 again. The short cycle timer therefore prevents the restart of the compressor for a period at least as long as that recommended by the compressor manufacturer.

Figure 7C:
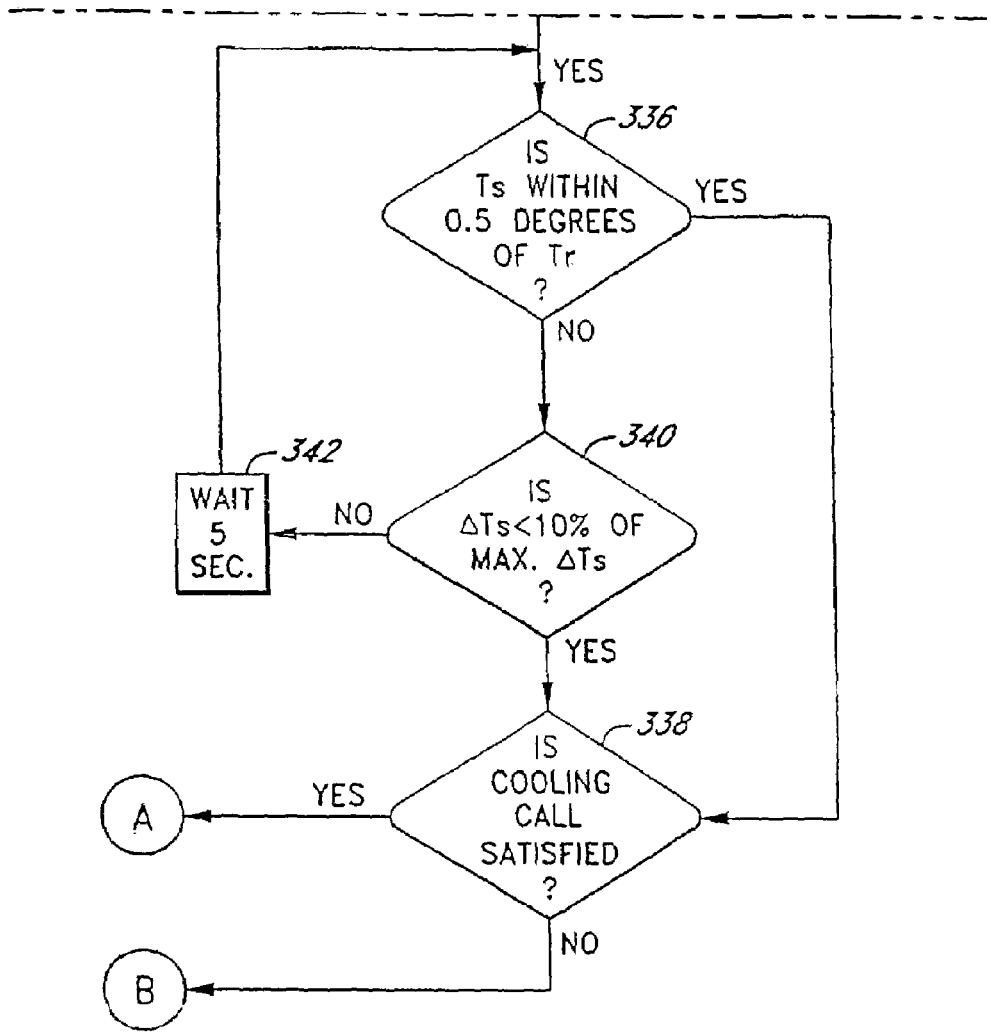
FIG. 7 is a composite of FIGS. 7A, 7B, and 7C, and is a flowchart illustrating another embodiment of the present invention during a call for cooling from a controlled space.

Another alternative control procedure for cooling is illustrated in FIGS. 7A through 7C. As with the procedures of FIGS. 5 and 6, the system begins in FIG. 7A at step 300 monitoring whether or not a call for cooling is being made. If not, the system waits for a call at step 302. If a call for cooling is has been received, the system moves to block 304, and checks the approximate humidity of the controlled space or, as explained above, the approximate humidity in the return air duct. If the measured humidity is greater than 60%, the controller is inhibited from initiating energy recovery, and conventional cooling control is performed at step 306. Typically, in the conventional control mode of block 306, the system simply cools at maximum capacity for the duration of any call for cooling, and is shut off otherwise. As one example, if the apparatus of FIGS. 3 and 4 is used to implement this method, the processor 120 is inhibited from opening either relay 136, 138.

If the humidity is below 60%, a cooling minimum run timer is set and started. If the call has just been received, and no prior energy recovery cycles have taken place, at step 308 a minimum run timer for the first cooling cycle is set and started. As will be discussed further below, if the system is returning from a recovery cycle, a minimum run timer of possibly different duration is set and started at step 310. Although suitable systems may be created using a run timer of the same duration for all cycles, it may be desirable for compressor operation if the first cooling cycle, which may follow lengthy off period, is somewhat longer than the cooling periods between recovery cycles. The minimum run timer of block 308 thus only affects compressor operation during the first cycle after receiving a call for cooling.

Moving now to block 312, the controller computes a target temperature for the air returning from the controlled space. This temperature is computed to ensure that the controlled space temperature is reduced by a minimum amount prior to the initiation of energy recovery. In some embodiments of the present invention, the target temperature may be calculated with the current return air temperature, a user programmable minimum cooling rate (which may advantageously be set to 2 to 5 degrees F per hour) and the initial set value of the minimum run timer, which may advantageously also be user programmable. In one embodiment, the target temperature is calculated by calculating the temperature reduction produced by a cooling of the air produced by maintaining the user programmed minimum rate for the duration of the minimum run timer initial setting. For example, if the programmable minimum cooling rate is 3 degrees per hour, and the minimum run timer is set to 6 minutes, the target temperature is set to 3 degrees per hour times 0.1 hours, or 0.3 degrees cooler than the current return air temperature.

At step 314 cooling is initiated. As discussed above with reference to FIGS. 5 and 6, this will occur immediately upon receipt of the call if the apparatus implementing this procedure is made in accordance with FIG. 4.

While the air conditioner is activated, at block 316 the system measures the temperature of the air in the controlled space. As mentioned above, this measurement can be made by directly sensing temperature in the controlled space, or by sensing the temperature in a return air duct. If the return temperature has not cooled to the target temperature, the controller performs no further action and at block 318 waits five seconds before making another measurement at block 316. Thus, the controller remains in the loop defined by blocks 316 and 318 until the approximate temperature of the air in the controlled space drops below the target temperature.

Referring now to FIG. 7B, once the approximate temperature of the controlled space drops below the target temperature, the system checks if the cooling call is satisfied at step 320. If it is, the system returns to block 300 on FIG. 7A, and waits for the next cooling call. If the cooling call has not been satisfied, at steps 322 and 324 the controller checks the status of the minimum run timer which was set and started at step 308 (or step 310 if this is not the first cycle following a call for cooling) described above. As long as this timer has not expired, the system waits in five second increments at step 326 until it has. If the system is a two-stage type, at block 324 the controller also monitors whether or not the second stage is currently activated. If the second stage is activated, a recovery cycle will be inappropriate, and the system will again wait in five second increments represented by block 326 until the second stage is off. It can be appreciated that all of these steps may be essentially continuously performed, with the microprocessor continuously monitoring the status of the pending call, temperatures, and timer, and waiting until all required conditions are fulfilled before moving to the next step.

Once the timer has expired, the controller initiates energy recovery at step 328, by, for example, opening relay 138 if the apparatus of FIG. 4 is used to implement this control procedure. Following the initiation of recovery at step 328, the short cycle timer is set and started at step 330. Once recovery is initiated and the compressor 66 is off, the air in the supply duct begins to warm, and to lose heat to the cold ducting material, other mechanical components of the HVAC system, and structural elements of the controlled space. Energy recovery thus continues as the supply air temperature warms, and the controller will wait until certain conditions are met before re-initiating cooling.

At this stage of the procedure, the short cycle timer, which was started at step 330, is checked at step 332 to see if it is timed out. If not, the controller then waits, in five second increments illustrated by step 334, for the short cycle timer to time out. The short cycle timer thus ensures an off time which may advantageously be programmed to help ensure that compressor operation is within the manufacturer's specifications.

As shown on FIG. 7C, once the short cycle timer times out, at step 336 the system check to see if the approximate temperature of the supply air is within 0.5 degrees of the approximate temperature of the controlled space (as may be determined by monitoring the air temperature in the return duct). If it is, this indicates that supply and return temperatures are equilibrating, and that therefore significant energy recovery from system components is no longer occurring. As illustrated by step 338, the system monitors the call status to see if the cooling call has been satisfied. If the cooling call has been satisfied, the system moves back to the start of the procedure at block 300 of FIG. 7A, and waits for the next call for cooling.

If the cooling call has not been satisfied, the system will then loop back to block 310 to begin the next on-cycle of the air conditioner. As before, after the system repeats the initiation of cooling at block 310, the minimum run timer is again set and started, and a new target temperature is calculated using the current air temperature of the controlled space as a new base point.

Returning now to step 336 of FIG. 7C, if the supply temperature $T_s$ is not within 0.5 degrees of the return temperature $T_r$, the system checks, at block 340, whether or not the current rate of change of the supply temperature is less than 10% of the maximum rate of change detected during the present off-cycle. In other words, is the slope of the supply temperature vs. time flattening out significantly, thereby indicating the onset of equilibration and reduction in the rate of energy recovery from system components. If the rate of change of the supply temperature is still greater than 10% of the maximum obtained during the present off cycle, the system waits for 5 seconds at block 342 and loops back to block 336 to re-compare the temperature of the return and supply air temperatures. Once this rate of change condition is satisfied, the controller loops back to block 310 to re-initiate cooling assuming the call for cooling is still pending. However, if the pending call gets satisfied at some point during the recovery cycle, the controller loops back to block 300 to await the next call.

A system operating in accordance with the procedure of FIGS. 7A through 7C will therefore continue to operate an air conditioning unit until a certain target temperature is reached and at least one minimum run timer has expired. Energy recovery is then initiated, which continues until the supply and return air temperatures are close to one another, or until the rate of change of the supply air temperature flattens considerably. The system cycles between the on-state and the recovery state until the call for cooling is satisfied.

Figure 8B:
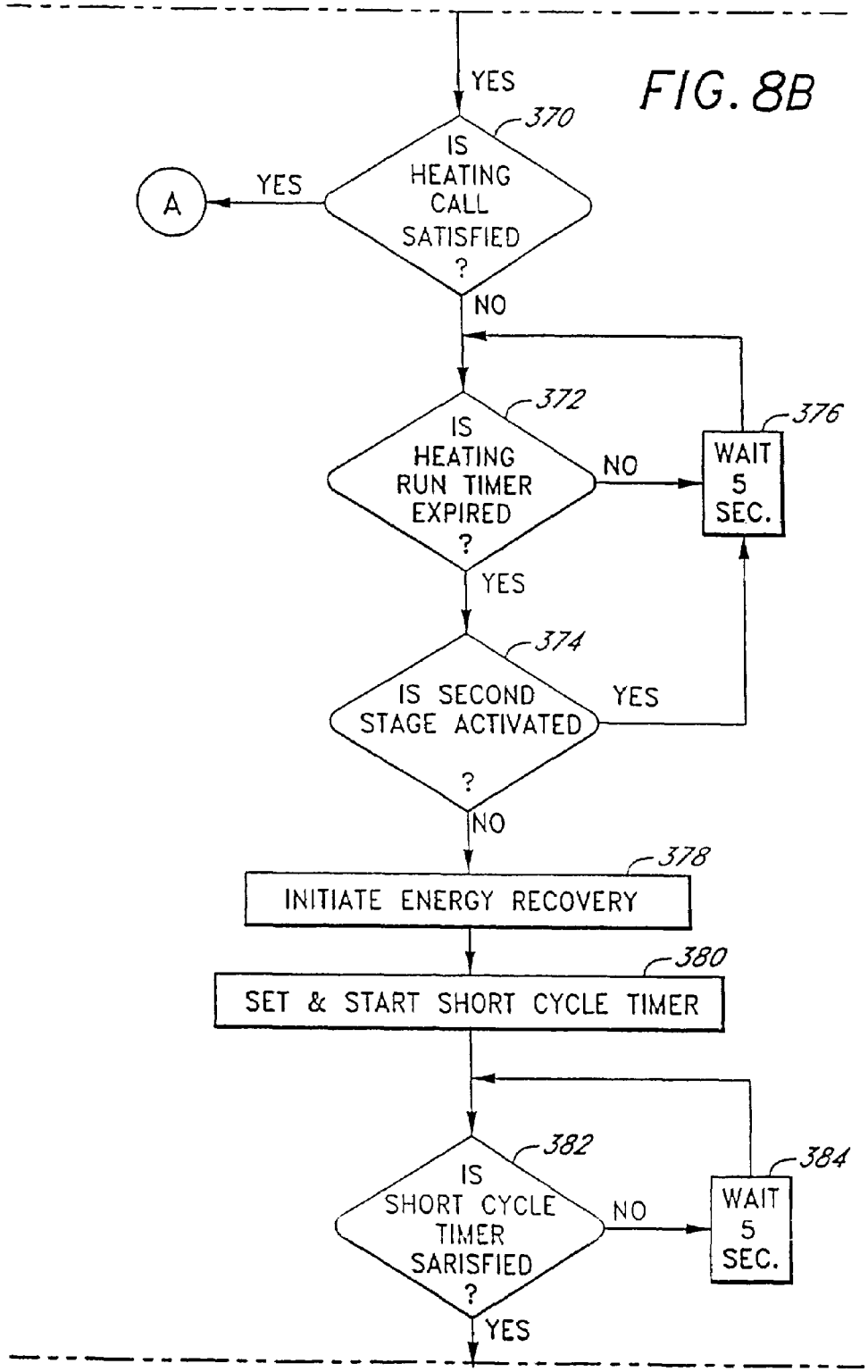
FIG. 8 is a composite of FIGS. 8A, 8B, and 8C, and is a flowchart illustrating another embodiment of the present invention during a call for heating from a controlled space.
Figure 8C:
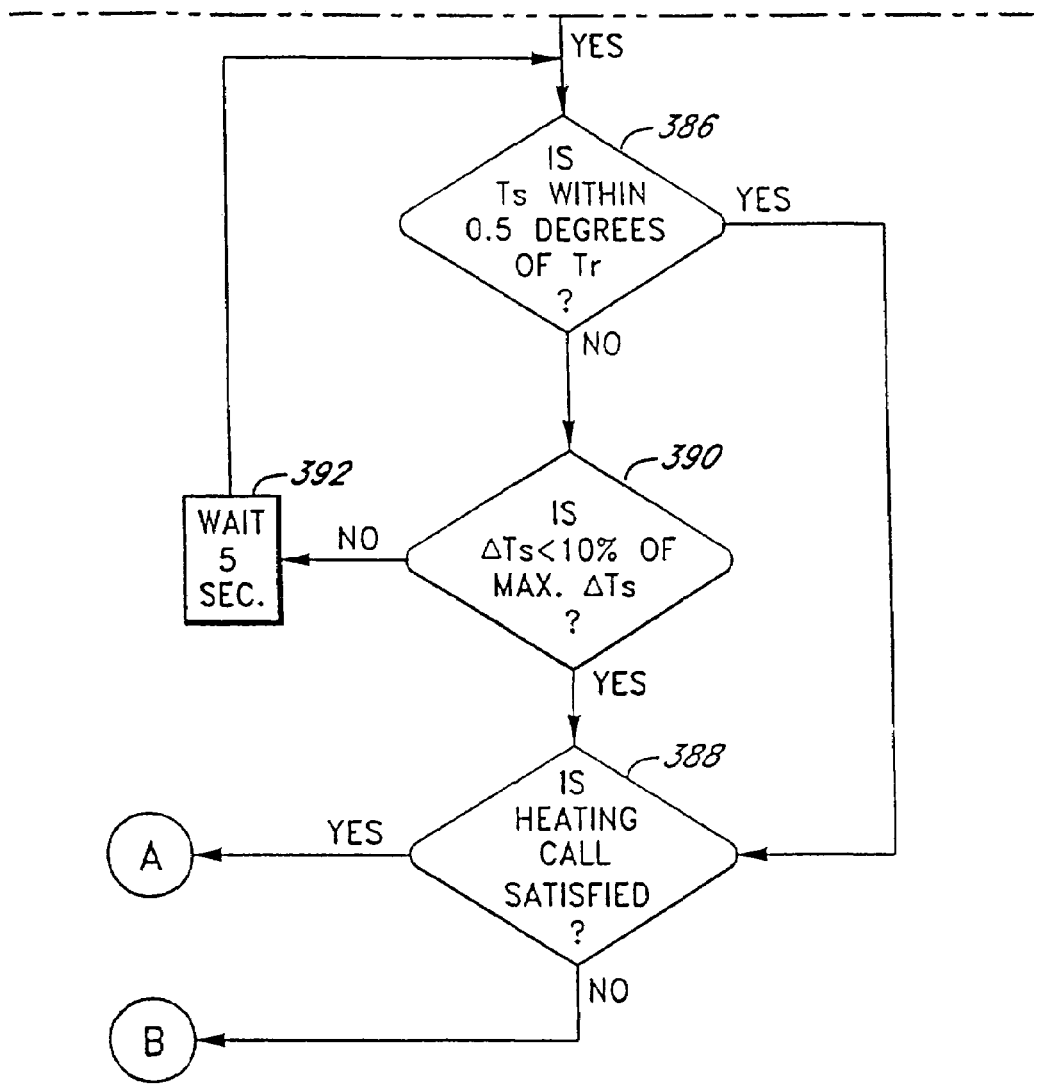

Another alternative control procedure for heating is illustrated in FIGS. 8A through 8C. This scheme is similar to that described with reference to FIGS. 7A through 7C. As with the procedure of FIG. 7, the system begins in FIG. 8A at step 350 monitoring whether or not a call for heating is being made. If not, the system waits for a call at step 352.

Once a call has been made, a heating minimum run timer is set and started. First, at step 358, a minimum run timer for the first heating cycle is set and started. As in the FIG. 7 embodiment described above, a minimum run timer of a different duration may be set and started at step 360 when the system loops back from a recovery cycle. Also in analogy with the FIG. 7 embodiment above, the first heating minimum run timer may be set longer than the minimum run timer which is effective for subsequent furnace-on cycles.

At step 362, the controller computes a target temperature for the air returning from the controlled space. This temperature is computed to ensure that the controlled space temperature is increased by a minimum amount prior to the initiation of energy recovery. In some embodiments of the present invention, the target temperature may be calculated with the current return air temperature, a user programmable minimum heating rate (which may advantageously be set to 2 to 5 degrees F per hour) and the initial set value of the minimum run timer, which may advantageously also be user programmable. In one embodiment, the target temperature is calculated by calculating the temperature increase produced by a heating of the air produced by maintaining the user programmed minimum rate for the duration of the minimum run timer initial setting. For example, if the programmable minimum heating rate is 3 degrees per hour, and the minimum run timer is set to 6 minutes, the target temperature is set to 3 degrees per hour times 0.1 hours, or 0.3 degrees warmer than the current return air temperature.

At step 364, heating is initiated. As discussed above with reference to FIGS. 5 and 6, this will occur immediately upon receipt of the call if the apparatus implementing this procedure is made in accordance with FIG. 4.

While the furnace is activated, at block 366 the system measures the temperature of the air in the controlled space. As mentioned above, this measurement can be made by directly sensing temperature in the controlled space, or by sensing the temperature in a return air duct. If the return temperature has not warmed to the target temperature, the controller performs no further action and at block 368 waits five seconds before making another measurement at block 366. Thus, the controller remains in the loop defined by blocks 366 and 368 until the approximate temperature of the air in the controlled space increases above the target temperature.

Referring now to FIG. 8B, once the approximate temperature of the controlled space rises above the target temperature, the system checks if the heating call is satisfied at step 370. If it is, the system returns to block 350 on FIG. 8A, and waits for the next heating call. If the heating call has not been satisfied, at step 372 the controller checks the status of the minimum run timer which was set and started at step 358 (or step 360 if this is not the first cycle following a call for heating) described above. As long as this timer has not expired, the system waits in five second increments at step 376 until it has. If the system is a two-stage type, at block 374 the controller also monitors whether or not the second stage is currently activated. If the second stage is activated, a recovery cycle will be inappropriate, and the system will again wait in five second increments represented by block 376 until the second stage is off. As discussed above, it can be appreciated that all of these steps may be essentially continuously performed, with the microprocessor continuously monitoring the status of the pending call, temperatures, and timer, and waiting until all required conditions are fulfilled before moving to the next step.

Once the timer has expired, the controller initiates energy recovery at step 378, by, for example, opening the relay contacts of the relay 136 if the apparatus of FIG. 4 is used to implement this control procedure. Following the initiation of recovery at step 378, the short cycle timer is set and started at step 380. Once recovery is initiated and the furnace is off, the air in the supply duct begins to cool, and to remove heat from the warm ducting material, other mechanical components of the HVAC system, and structural elements of the controlled space. Energy recovery thus continues as the supply air temperature cools toward the ambient temperature, and the controller will wait until certain conditions are met before re-initiating heating.

At this stage of the procedure, the short cycle timer, which was started at step 380, is checked at step 382 to see if it is timed out. If not, the controller then waits, in five second increments illustrated by step 384, for the short cycle timer to time out. The short cycle timer thus ensures an off time which may advantageously be programmed to help ensure that furnace operation is within the manufacturer's specifications.

Referring now to FIG. 8C, once the short cycle timer times out, at step 386 the system check to see if the approximate temperature of the supply air is within 0.5 degrees of the approximate temperature of the controlled space (as may be determined by monitoring the air temperature in the return duct). If it is, this indicates that supply and return temperatures are equilibrating, and that therefore significant energy recovery from system components is no longer occurring. As illustrated by step 388, the system monitors the call status to see if the heating call has been satisfied at block 388. If the heating call has been satisfied, the system moves back to the start of the procedure at block 350 of FIG. 8A, and waits for the next call for heating.

If the heating call has not been satisfied, the system will then loop back to block 358 to begin the next on-cycle of the furnace. As before, after the system repeats the initiation of heating at block 360, the minimum run timer is again set and started, and a target temperature is calculated using the current air temperature of the controlled space as a new base point. It may also be noted that for this and subsequent on-cycles, the minimum first run timer is not re-set or re-started. Thus, the system effectively waits only for the attainment of the target temperature and the expiration of the minimum run timer at block 374 before initiating another energy recovery cycle at block 378 of FIG. 8B.

Returning now to step 386 of FIG. 8C, if the supply temperature $T_s$ is not within 0.5 degrees of the return temperature $T_r$, the system checks, at block 390, whether or not the current rate of change of the supply temperature is less than 10% of the maximum rate of change detected during the present off-cycle. In other words, is the slope of the supply temperature vs. time flattening out significantly, thereby indicating the onset of equilibration and reduction in the rate of energy recovery from system components. If the rate of change of the supply temperature is still greater than 10% of the maximum obtained during the present off cycle, the system waits for 5 seconds at block 392 and loops back to block 386 to re-compare the temperature of the return and supply air temperatures. Once this rate of change condition is satisfied, the controller loops back to block 360 to re-initiate heating assuming the call for heating is still pending. However, if the pending call gets satisfied at some point during the recovery cycle, the controller loops back to block 350 to await the next call.

Thus, in analogy with FIGS. 7A through 7C, a system operating in accordance with the procedure of FIGS. 8A through 8C will continue to operate a furnace until a certain target temperature is reached and at least one minimum run timer has expired. Energy recovery is then initiated, which continues until the supply and return air temperatures are close to one another, or until the rate of change of the supply air temperature flattens considerably. The system cycles between the on-state and the recovery state until the call for heating is satisfied.

It can be appreciated that in many embodiments of the above described procedures, the various evaluation of environmental and physical parameters such as temperature, humidity, durations, etc. will be essentially constantly performed. For example, when implementing these methods with the controller of FIG. 4, the humidity can be constantly monitored, and the controller can be disabled from affecting the normally closed state of the relays 136, 138 until the humidity drops below its setpoint. Thus, the particular order and sequence of the flowcharts of FIGS. 5 through 8 is not intended to indicate that this order is required. In some embodiments of these methods implemented with the apparatus of FIGS. 3 and 4 for example, it can be seen that the calls for cooling and heating still directly control the furnace and compressor, and thus the controller cannot force heating or cooling to occur when no call is present. Thus, the initiation of heating or cooling can be implemented by simply allowing the normal cooling or heating calls to pass through the controller. Many different specific implementations of parameter monitoring and HVAC control in accordance with principles of the present invention will be possible to those of ordinary skill in the art based on this disclosure.

Figure 9:
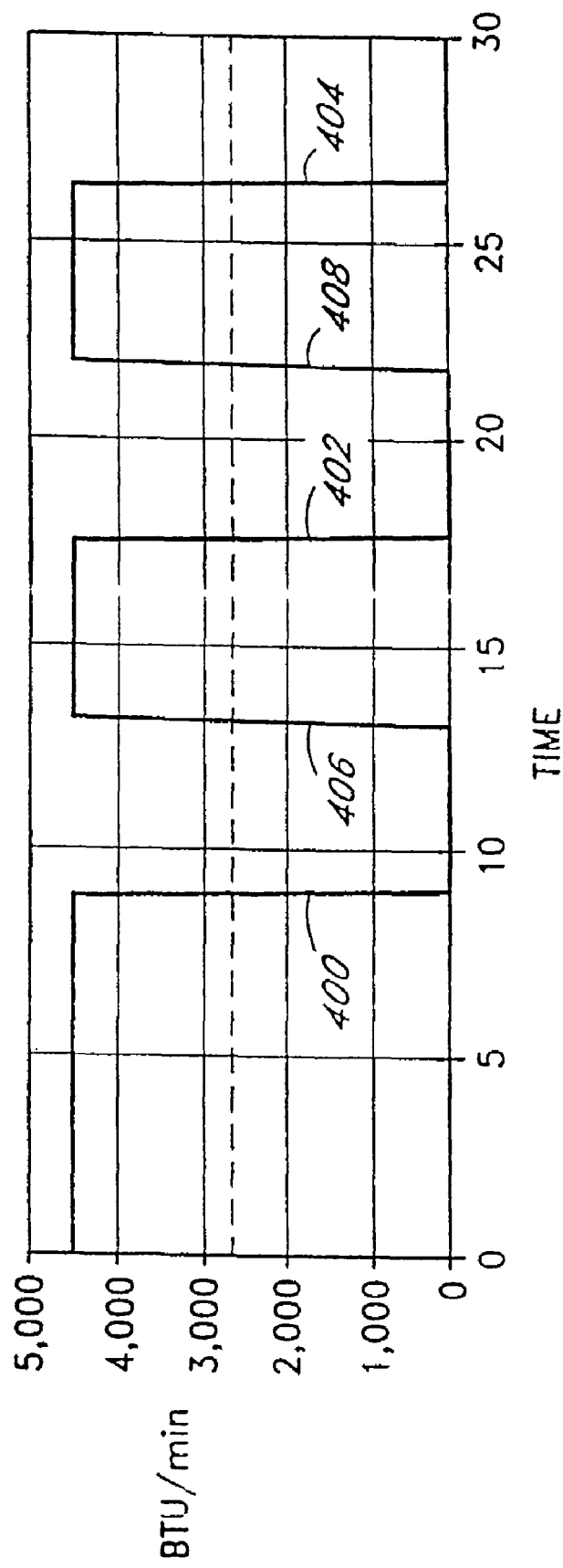
FIG. 9 is a graph of gas use as a function of time for an HVAC system which is operated in accordance with principles of the present invention.

The graphs of FIGS. 9 through 12 illustrate energy consumption levels and energy output levels for a typical five ton HVAC system responding to an example 30 minute call for environmental modification with an energy controller operating in accordance with some principles of the present invention. FIG. 9 illustrates BTU per minute of gas use over the 30 minute period. Drop offs 400, 402, 404 in gas use indicate the initiation of energy recovery. Increases in gas use 406, 408, indicate re-initiation of heating after each period of energy recovery. When the gas is on, an energy equivalent of 4,444 BTUs per minute are being consumed in the furnace. The average energy consumption over the several on/off cycles of gas use is 2,645 BTUs.

Figure 10:
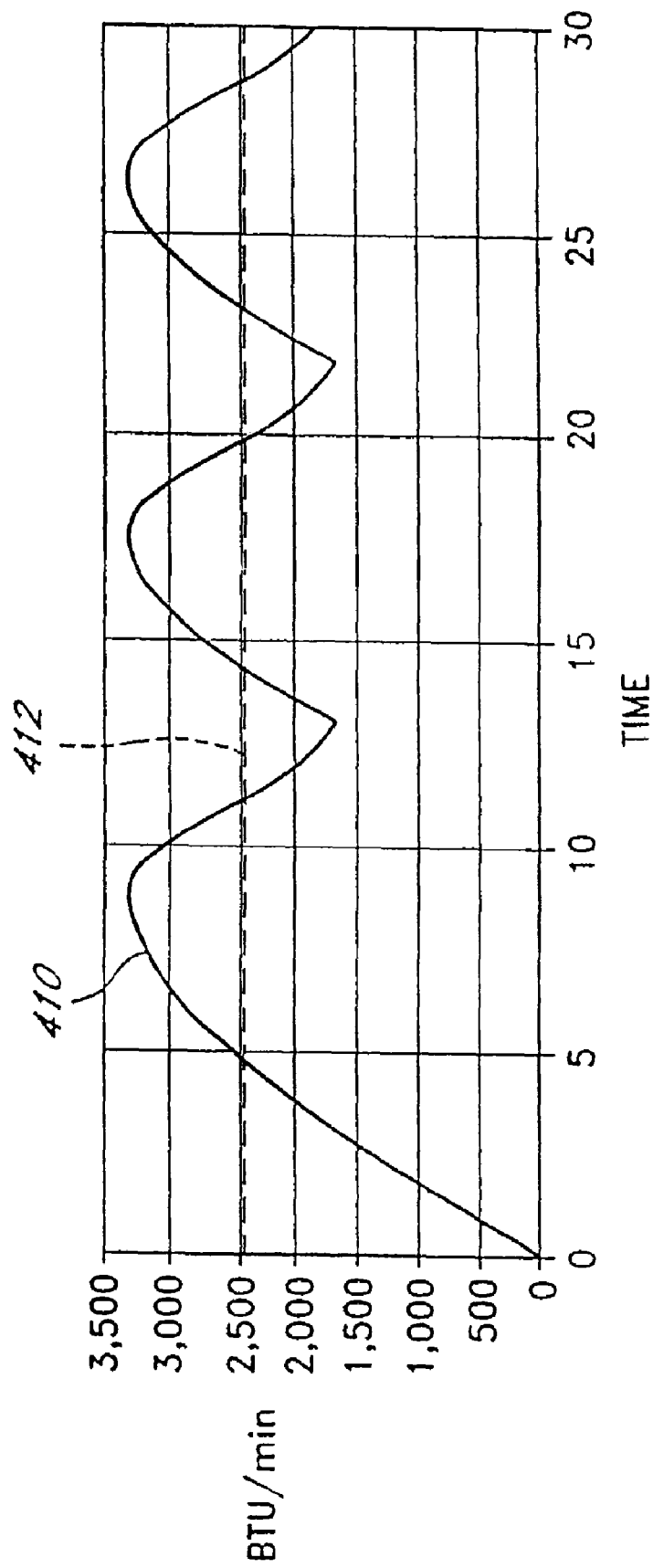
FIG. 10 is a graph illustrating instantaneous and average energy output to a controlled space when the HVAC system is operated in heating mode in accordance with principles of the present invention.

FIG. 10 is a graph of BTU output to the controlled space during the period of gas use shown in FIG. 9. The instantaneous BTU output 410 has a peak of approximately 3400 BTU per minute delivered to the controlled space. The average BTU output 412 to the room is approximately 2455 BTU per minute. Due to energy recovery from system components, the decrease in average energy input is greater than the decrease in average energy output. An increase in heating efficiency is thus attained.

Figure 11:
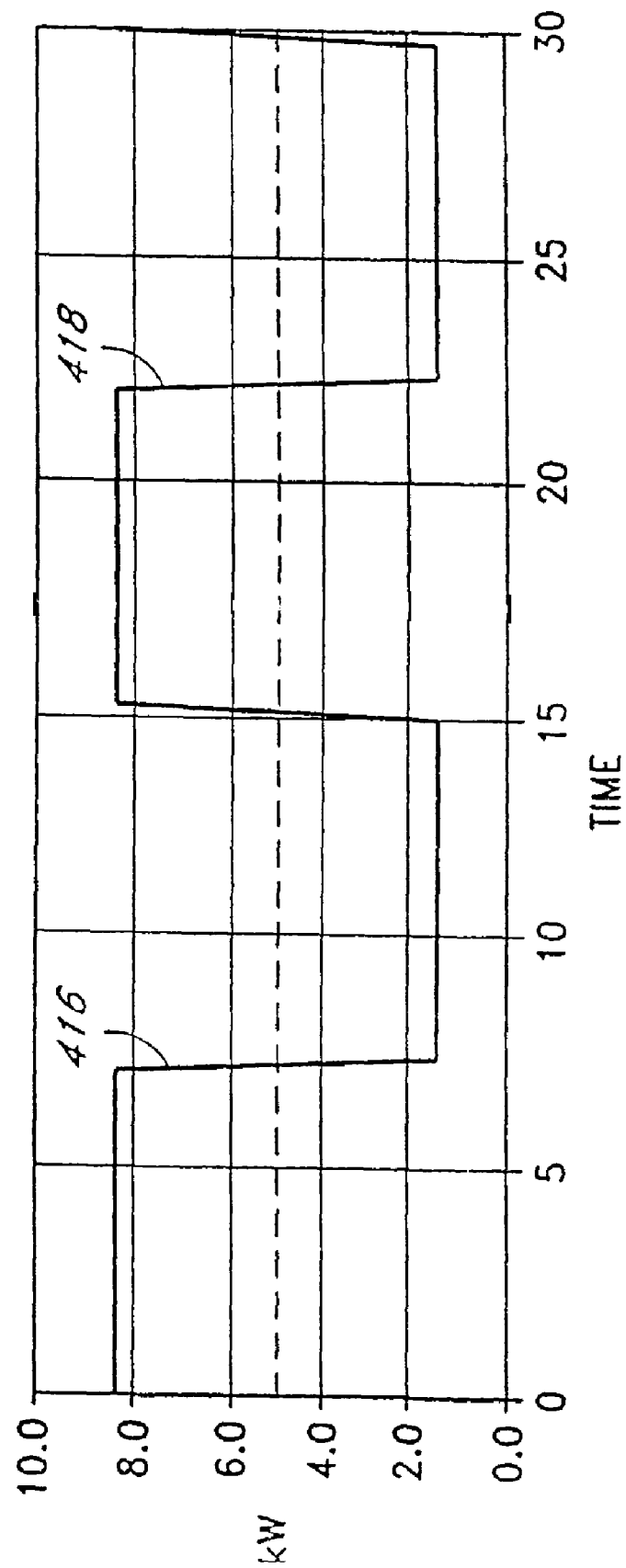
FIG. 11 is a graph of input power as a function of time for an HVAC system which is operated in accordance with principles of the present invention.
Figure 12:
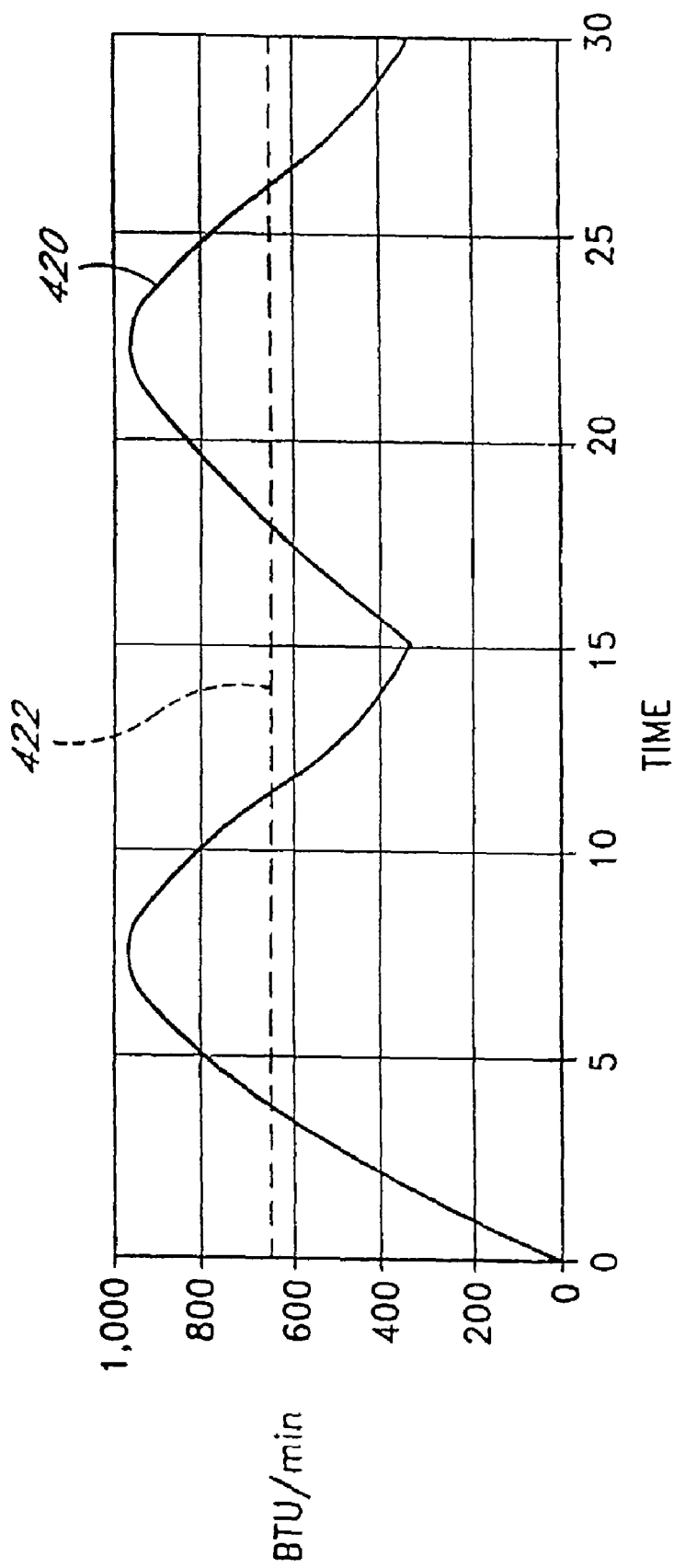
FIG. 12 is a graph illustrating instantaneous and average energy output to a controlled space when the HVAC system is operated in cooling mode in accordance with principles of the present invention.

FIGS. 11 and 12 demonstrate a similar effect in a cooling mode. The compressor is effectively cycled, resulting in energy consumption reductions at points 416 and 418 of approximately 80%. The remaining 20% of the power consumed during energy recover periods is consumed mainly by the air supply fan, which as described above, preferably remains operational. Referring now to FIG. 12, it can be seen that in a manner analogous to the heating graph of FIG. 10, the instantaneous BTU per minute removed the controlled space in cooling 420 rises and falls depending on whether or not the HVAC controller is in energy recovery mode. The average energy transfer 422 however, remains high enough to produce a significant increase in cooling efficiency.

The above described invention therefore provides many advantages over prior art HVAC control systems and methods. One major benefit is the provision of reduced energy consumption without significantly reducing the comfort of occupants of the controlled space. In addition, safeguards such as minimum run timers and short cycle timers may be provided to protect the HVAC equipment form over-cycling.

The digital nature of the preferred embodiment also allows for a convenient programmable mode of operation which allows energy savings to be determined empirically with a high degree of accuracy. The HVAC controller of the present invention can be programmed to refrain from entering energy recovery mode on alternating 24 hour periods. Relevant data such as on and off times and energy outputs may be stored in the on-board memory over an extended 30 to 60 day test period. The total energy consumption of the environmental control system is compared for the two periods, one with the energy recovery mode operational, and the other without. The energy consumption of the system can be estimated by measuring on-time durations for heating and cooling, or can be measured more directly by gas flow sensors and ammeters or wattmeters situated to provide essentially direct power consumption measurements. Furthermore, variations in the duration of recovery disabled mode vs. recovery enabled mode can be made depending on the nature of the specific installation. Advantageously, the data can be made available to system administrators via the I/O port.

The foregoing description details certain preferred embodiments of the present invention and describes the best mode contemplated. It will be appreciated, however, that no matter how detailed the foregoing appears in text, the invention can be practiced in many ways. As is also stated above, it should be noted that the use of particular terminology when describing certain features or aspects of the present invention should not be taken to imply that the broadest reasonable meaning of such terminology is not intended, or that the terminology is being re-defined herein to be restricted to including any specific characteristics of the features or aspects of the invention with which that terminology is associated. The scope of the present invention should therefore be construed in accordance with the appended Claims and any equivalents thereof.

What is claimed is:

1. A method of cooling a controlled space, comprising:
receiving a call for cooling;
initiating operation of an air conditioning unit;
calculating a target temperature based on a current return air temperature, a set cooling rate and an initial set value of a run timer;
measuring a temperature of said controlled space;
monitoring a humidity of said controlled space; and
turning off at least a portion of said air conditioning unit when both:
 said humidity is below a predetermined value, and
said measured temperature is lower than said target temperature.

2. The method of claim 1 further comprising:
programming the cooling rate of the air conditioning unit by a user.

3. The method of claim 1 further comprising:
programming the run timer to the initial set value by a user.

4. A method of cooling a controlled space, comprising:
receiving a call for cooling;
initiating operation of an air conditioning unit;
calculating a target temperature by determining a temperature reduction produced by cooling air at a programmed cooling rate for a programmed duration;
measuring a temperature of said controlled space;
monitoring a humidity of said controlled space; and
turning off at least a portion of said air conditioning unit when both:
 said humidity is below a predetermined value, and
said measured temperature is lower than said target temperature.

* * * * *